United States Patent
Bradford et al.

(10) Patent No.: US 9,626,355 B2
(45) Date of Patent: *Apr. 18, 2017

(54) CONTEXTUAL PREDICTION OF USER WORDS AND USER ACTIONS

(71) Applicant: NUANCE COMMUNICATIONS, INC., Burlington, MA (US)

(72) Inventors: Ethan R. Bradford, Seattle, WA (US); David J. Kay, Seattle, WA (US); Michael Longe, Seattle, WA (US); Pim Van Meurs, Kenmore, WA (US); Gaurav Tandon, Redmond, WA (US)

(73) Assignee: NUANCE COMMUNICATIONS, INC., Burlington, WA (US)

( * ) Notice: Subject to any disclaimer, the term of this patent is extended or adjusted under 35 U.S.C. 154(b) by 189 days.

This patent is subject to a terminal disclaimer.

(21) Appl. No.: 14/472,279

(22) Filed: Aug. 28, 2014

(65) Prior Publication Data

US 2014/0372345 A1 Dec. 18, 2014

Related U.S. Application Data

(63) Continuation of application No. 11/379,747, filed on Apr. 21, 2006, now Pat. No. 8,938,688, and a (Continued)

(51) Int. Cl.
*G06F 3/00* (2006.01)
*G06F 3/048* (2013.01)
(Continued)

(52) U.S. Cl.
CPC .......... *G06F 17/276* (2013.01); *G06F 3/0481* (2013.01); *G06F 3/0482* (2013.01);
(Continued)

(58) Field of Classification Search
None
See application file for complete search history.

(56) References Cited

U.S. PATENT DOCUMENTS

| 3,967,273 A | 6/1976 | Knowlton |
| 4,003,025 A | 1/1977 | Hilliard et al. |

(Continued)

FOREIGN PATENT DOCUMENTS

| CN | 1518704 | 4/2004 |
| EP | 0313975 | 5/1989 |

(Continued)

OTHER PUBLICATIONS

"America Online, Inc. Acquires Tegic Communications", www.tegic.com/pressreleases/pr_aolacquisition.html, Press Release from Tegic Communications, Dec. 1, 1999, 1-3.

(Continued)

*Primary Examiner* — Yongjia Pan
(74) *Attorney, Agent, or Firm* — Perkins Coie LLP

(57) ABSTRACT

An operating sequence for a handheld computing device manages the device to automatically detect cues describing the device's environmental and user actions performed with the device, learn which cues and cue combinations are relevant to predict user actions, and then in response to occurrence of the relevant cues, predictively implementing the appropriate user action or configuring the device in anticipation of user action.

11 Claims, 6 Drawing Sheets

Related U.S. Application Data continuation-in-part of application No. 10/866,634, filed on Jun. 10, 2004, now Pat. No. 7,679,534, and a continuation-in-part of application No. 10/176,933, filed on Jun. 20, 2002, now Pat. No. 7,712,053, which is a continuation-in-part of application No. 09/454,406, filed on Dec. 3, 1999, now Pat. No. 6,646,573.

(60) Provisional application No. 60/734,840, filed on Nov. 9, 2005, provisional application No. 60/504,240, filed on Sep. 19, 2003, provisional application No. 60/110,890, filed on Dec. 4, 1998.

(51) Int. Cl.

| | | |
|---|---|---|
| *G06F 17/27* | (2006.01) | |
| *G06F 3/0481* | (2013.01) | |
| *G06F 9/455* | (2006.01) | |
| *G06F 3/0482* | (2013.01) | |
| *G06N 5/04* | (2006.01) | |
| *G06N 99/00* | (2010.01) | |
| G06F 3/14 | (2006.01) | |
| G06F 17/00 | (2006.01) | |
| G06F 15/00 | (2006.01) | |
| G06E 1/00 | (2006.01) | |
| H04M 1/725 | (2006.01) | |

(52) U.S. Cl.
CPC .......... *G06F 9/45512* (2013.01); *G06N 5/04* (2013.01); *G06N 99/005* (2013.01); *H04M 1/72569* (2013.01); *H04M 1/72566* (2013.01); *H04M 1/72572* (2013.01); *H04M 2250/10* (2013.01)

(56) References Cited

U.S. PATENT DOCUMENTS

| | | | |
|---|---|---|---|
| 4,164,025 | A | 8/1979 | Dubnowski et al. |
| 4,191,854 | A | 3/1980 | Coles |
| 4,339,806 | A | 7/1982 | Yoshida |
| 4,360,892 | A | 11/1982 | Endfield |
| 4,396,992 | A | 8/1983 | Hayashi et al. |
| 4,427,848 | A | 1/1984 | Tsakanikas |
| 4,442,506 | A | 4/1984 | Endfield |
| 4,464,070 | A | 8/1984 | Hanft et al. |
| 4,481,508 | A | 11/1984 | Kamei et al. |
| 4,544,276 | A | 10/1985 | Horodeck |
| 4,586,160 | A | 4/1986 | Amano et al. |
| 4,649,563 | A | 3/1987 | Riskin |
| 4,650,927 | A | 3/1987 | James |
| 4,661,916 | A | 4/1987 | Baker et al. |
| 4,669,901 | A | 6/1987 | Feng |
| 4,674,112 | A | 6/1987 | Kondraske et al. |
| 4,677,659 | A | 6/1987 | Dargan |
| 4,679,951 | A | 7/1987 | King et al. |
| 4,744,050 | A | 5/1988 | Hirosawa et al. |
| 4,754,474 | A | 6/1988 | Feinson |
| RE32,773 | E | 10/1988 | Goldwasser et al. |
| 4,791,556 | A | 12/1988 | Vilkaitis |
| 4,807,181 | A | 2/1989 | Duncan |
| 4,817,129 | A | 3/1989 | Riskin |
| 4,866,759 | A | 9/1989 | Riskin |
| 4,872,196 | A | 10/1989 | Royer et al. |
| 4,891,786 | A | 1/1990 | Goldwasser |
| 4,969,097 | A | 11/1990 | Levin |
| 5,018,201 | A | 5/1991 | Sugawara |
| 5,031,206 | A | 7/1991 | Riskin |
| 5,041,967 | A | 8/1991 | Ephrath et al. |
| 5,067,103 | A | 11/1991 | Lapeyre |
| 5,109,352 | A | 4/1992 | O'Dell |
| 5,115,501 | A * | 5/1992 | Kerr ..................... G06F 9/4446 |
| 5,128,672 | A | 7/1992 | Kaehler |
| 5,131,045 | A | 7/1992 | Roth et al. |
| 5,133,012 | A | 7/1992 | Nitta |
| 5,163,084 | A | 11/1992 | Kim et al. |
| 5,200,988 | A | 4/1993 | Riskin |
| 5,210,689 | A | 5/1993 | Baker et al. |
| 5,218,538 | A | 6/1993 | Zhang |
| 5,229,936 | A | 7/1993 | Decker et al. |
| 5,255,310 | A | 10/1993 | Kim et al. |
| 5,258,748 | A | 11/1993 | Jones |
| 5,267,181 | A | 11/1993 | George |
| 5,288,158 | A | 2/1994 | Matias |
| 5,289,394 | A | 2/1994 | Lapeyre |
| 5,303,299 | A | 4/1994 | Hunt et al. |
| 5,305,205 | A | 4/1994 | Weber et al. |
| 5,339,358 | A | 8/1994 | Danish et al. |
| 5,371,851 | A | 12/1994 | Pieper et al. |
| 5,373,290 | A | 12/1994 | Lempel et al. |
| 5,388,061 | A | 2/1995 | Hankes |
| 5,392,338 | A | 2/1995 | Danish et al. |
| 5,406,480 | A | 4/1995 | Kanno |
| 5,535,421 | A | 7/1996 | Weinreich |
| 5,559,512 | A | 9/1996 | Jasinski et al. |
| 5,586,198 | A | 12/1996 | Lakritz |
| 5,623,261 | A | 4/1997 | Rose |
| 5,642,522 | A | 6/1997 | Zaenen et al. |
| 5,664,896 | A | 9/1997 | Blumberg |
| 5,680,511 | A | 10/1997 | Baker et al. |
| 5,714,983 | A * | 2/1998 | Sacks ..................... G06F 3/023 341/22 |
| 5,726,688 | A * | 3/1998 | Siefert .................. G06F 3/0482 715/808 |
| 5,748,512 | A | 5/1998 | Vargas |
| 5,774,860 | A * | 6/1998 | Bayya ..................... G10L 15/22 700/246 |
| 5,786,776 | A | 7/1998 | Kisaichi et al. |
| 5,797,098 | A | 8/1998 | Schroeder et al. |
| 5,805,911 | A | 9/1998 | Miller |
| 5,818,437 | A | 10/1998 | Grover et al. |
| 5,825,353 | A | 10/1998 | Will |
| 5,828,991 | A | 10/1998 | Skiena |
| 5,847,697 | A | 12/1998 | Sugimoto |
| 5,855,000 | A | 12/1998 | Waibel et al. |
| 5,861,821 | A | 1/1999 | Kato et al. |
| 5,896,321 | A | 4/1999 | Miller et al. |
| 5,903,454 | A * | 5/1999 | Hoffberg ............... G06F 3/0482 382/155 |
| 5,917,890 | A | 6/1999 | Brotman et al. |
| 5,917,941 | A | 6/1999 | Webb et al. |
| 5,926,566 | A | 7/1999 | Wang et al. |
| 5,936,556 | A | 8/1999 | Sakita |
| 5,937,380 | A | 8/1999 | Segan |
| 5,937,422 | A | 8/1999 | Nelson et al. |
| 5,945,928 | A | 8/1999 | Kushler et al. |
| 5,952,942 | A | 9/1999 | Balakrishnan et al. |
| 5,953,541 | A | 9/1999 | King et al. |
| 5,960,385 | A | 9/1999 | Skiena et al. |
| 5,963,671 | A | 10/1999 | Comerford et al. |
| 5,999,950 | A | 12/1999 | Krueger et al. |
| 6,005,498 | A | 12/1999 | Yang et al. |
| 6,008,799 | A | 12/1999 | Van Kleeck |
| 6,009,444 | A | 12/1999 | Chen |
| 6,011,554 | A | 1/2000 | King et al. |
| 6,041,323 | A | 3/2000 | Kubota |
| 6,044,347 | A | 3/2000 | Buntschuh |
| 6,054,941 | A | 4/2000 | Chen |
| 6,064,959 | A | 5/2000 | Young et al. |
| 6,073,101 | A | 6/2000 | Maes |
| 6,081,750 | A * | 6/2000 | Hoffberg ................. G06F 3/00 345/520 |
| 6,098,086 | A | 8/2000 | Krueger et al. |
| 6,104,317 | A | 8/2000 | Panagrossi |
| 6,120,297 | A | 9/2000 | Morse, III et al. |
| 6,121,968 | A | 9/2000 | Arcuri et al. |
| 6,130,628 | A | 10/2000 | Schneider-hufschmidt et al. |
| 6,169,538 | B1 | 1/2001 | Nowlan et al. |
| 6,172,625 | B1 | 1/2001 | Jin et al. |
| 6,178,401 | B1 | 1/2001 | Franz et al. |
| 6,204,848 | B1 | 3/2001 | Nowlan et al. |
| 6,208,966 | B1 | 3/2001 | Bulfer |
| 6,219,731 | B1 | 4/2001 | Gutowitz |

(56) References Cited

U.S. PATENT DOCUMENTS

| | | | |
|---|---|---|---|
| 6,223,059 B1 | 4/2001 | Haestrup | |
| 6,246,761 B1 | 6/2001 | Cuddy | |
| 6,278,968 B1 | 8/2001 | Franz et al. | |
| 6,286,064 B1 | 9/2001 | King et al. | |
| 6,304,844 B1 | 10/2001 | Pan et al. | |
| 6,307,548 B1 | 10/2001 | Flinchem et al. | |
| 6,307,549 B1 | 10/2001 | King et al. | |
| 6,346,894 B1 | 2/2002 | Connolly et al. | |
| 6,362,752 B1 | 3/2002 | Guo et al. | |
| 6,363,347 B1 | 3/2002 | Rozak | |
| 6,377,965 B1 * | 4/2002 | Hachamovitch | G06F 17/276 715/203 |
| 6,392,640 B1 | 5/2002 | Will | |
| 6,393,395 B1 | 5/2002 | Guha et al. | |
| 6,407,679 B1 | 6/2002 | Evans et al. | |
| 6,421,672 B1 | 7/2002 | McAllister et al. | |
| 6,424,743 B1 | 7/2002 | Ebrahimi | |
| 6,453,281 B1 | 9/2002 | Walters et al. | |
| 6,466,232 B1 * | 10/2002 | Newell | G06F 1/163 345/3.1 |
| 6,502,118 B1 | 12/2002 | Chatterjee | |
| 6,542,170 B1 | 4/2003 | Williams et al. | |
| 6,559,778 B1 | 5/2003 | Hillmering | |
| 6,567,075 B1 | 5/2003 | Baker et al. | |
| 6,574,597 B1 | 6/2003 | Mohri et al. | |
| 6,584,179 B1 | 6/2003 | Fortier et al. | |
| 6,621,424 B1 | 9/2003 | Brand | |
| 6,633,846 B1 | 10/2003 | Bennett et al. | |
| 6,636,162 B1 | 10/2003 | Kushler et al. | |
| 6,646,573 B1 | 11/2003 | Kushler et al. | |
| 6,665,640 B1 | 12/2003 | Bennett et al. | |
| 6,684,185 B1 | 1/2004 | Junqua et al. | |
| 6,686,852 B1 | 2/2004 | Guo | |
| 6,711,290 B2 | 3/2004 | Sparr et al. | |
| 6,728,348 B2 | 4/2004 | Deneberg et al. | |
| 6,734,881 B1 | 5/2004 | Will | |
| 6,738,952 B1 | 5/2004 | Yamamuro | |
| 6,751,605 B2 | 6/2004 | Gunji et al. | |
| 6,757,544 B2 | 6/2004 | Rangarajan et al. | |
| 6,789,231 B1 | 9/2004 | Reynar et al. | |
| 6,801,190 B1 | 10/2004 | Robinson et al. | |
| 6,801,659 B1 | 10/2004 | O'Dell | |
| 6,807,529 B2 | 10/2004 | Johnson et al. | |
| 6,848,080 B1 | 1/2005 | Lee et al. | |
| 6,864,809 B2 | 3/2005 | O'Dell et al. | |
| 6,885,317 B1 | 4/2005 | Gutowitz | |
| 6,912,386 B1 | 6/2005 | Himberg et al. | |
| 6,912,581 B2 | 6/2005 | Johnson et al. | |
| 6,920,420 B2 | 7/2005 | Lin | |
| 6,934,564 B2 | 8/2005 | Laukkanen et al. | |
| 6,947,771 B2 | 9/2005 | Guo et al. | |
| 6,955,602 B2 | 10/2005 | Williams | |
| 6,956,968 B1 | 10/2005 | O'Dell et al. | |
| 6,973,332 B2 | 12/2005 | Mirkin et al. | |
| 6,982,658 B2 | 1/2006 | Guo | |
| 6,985,933 B1 | 1/2006 | Singhal et al. | |
| 7,006,820 B1 | 2/2006 | Parket et al. | |
| 7,013,258 B1 | 3/2006 | Su et al. | |
| 7,020,849 B1 | 3/2006 | Chen | |
| 7,027,976 B1 | 4/2006 | Sites | |
| 7,030,863 B2 | 4/2006 | Longe | |
| 7,043,700 B1 * | 5/2006 | Bertram | G06F 15/025 715/217 |
| 7,057,607 B2 | 6/2006 | Mayoraz et al. | |
| 7,061,403 B2 | 6/2006 | Fux | |
| 7,075,520 B2 | 7/2006 | Williams | |
| 7,095,403 B2 | 8/2006 | Lyustin | |
| 7,098,896 B2 | 8/2006 | Kushler et al. | |
| 7,107,204 B1 | 9/2006 | Liu et al. | |
| 7,139,430 B2 | 11/2006 | Sparr et al. | |
| 7,152,213 B2 | 12/2006 | Pu et al. | |
| 7,224,292 B2 | 5/2007 | Lazaridis et al. | |
| 7,256,769 B2 | 8/2007 | Pun et al. | |
| 7,257,528 B1 | 8/2007 | Ritchie et al. | |
| 7,263,238 B2 | 8/2007 | Singh | |
| 7,272,564 B2 | 9/2007 | Phillips et al. | |
| 7,313,277 B2 | 12/2007 | Morwing et al. | |
| 7,349,576 B2 | 3/2008 | Holtsberg | |
| 7,386,454 B2 | 6/2008 | Gopinath et al. | |
| 7,387,457 B2 | 6/2008 | Jawerth et al. | |
| 7,389,235 B2 | 6/2008 | Dvorak | |
| 7,395,203 B2 | 7/2008 | He et al. | |
| 7,437,001 B2 | 10/2008 | Morwing et al. | |
| 7,466,859 B2 | 12/2008 | Chang et al. | |
| 7,546,529 B2 | 6/2009 | Reynar et al. | |
| 7,598,890 B2 | 10/2009 | Park et al. | |
| 7,626,574 B2 | 12/2009 | Kim | |
| 7,679,534 B2 | 3/2010 | Kay et al. | |
| 7,712,053 B2 | 5/2010 | Kay et al. | |
| 7,881,936 B2 | 2/2011 | Longe et al. | |
| 8,036,878 B2 | 10/2011 | Assadollahi | |
| 8,095,364 B2 | 1/2012 | Longe et al. | |
| 8,103,499 B2 | 1/2012 | Lai et al. | |
| 8,381,137 B2 | 2/2013 | Bradford et al. | |
| 2001/0003184 A1 | 6/2001 | Ching et al. | |
| 2001/0040517 A1 | 11/2001 | Kisaichi et al. | |
| 2002/0019731 A1 | 2/2002 | Masui et al. | |
| 2002/0038207 A1 | 3/2002 | Mori et al. | |
| 2002/0054135 A1 | 5/2002 | Noguchi et al. | |
| 2002/0072395 A1 | 6/2002 | Miramontes | |
| 2002/0097227 A1 | 7/2002 | Chu et al. | |
| 2002/0119788 A1 | 8/2002 | Parupudi et al. | |
| 2002/0123367 A1 | 9/2002 | Savolainen et al. | |
| 2002/0126097 A1 | 9/2002 | Savolainen | |
| 2002/0135499 A1 | 9/2002 | Guo | |
| 2002/0145587 A1 | 10/2002 | Watanabe | |
| 2002/0152075 A1 | 10/2002 | Kung et al. | |
| 2002/0188448 A1 | 12/2002 | Goodman et al. | |
| 2002/0196163 A1 | 12/2002 | Bradford et al. | |
| 2003/0011574 A1 | 1/2003 | Goodman | |
| 2003/0023420 A1 | 1/2003 | Goodman | |
| 2003/0023426 A1 | 1/2003 | Pun et al. | |
| 2003/0036411 A1 | 2/2003 | Kraft | |
| 2003/0054830 A1 | 3/2003 | Williams et al. | |
| 2003/0073451 A1 | 4/2003 | Kraft | |
| 2003/0078038 A1 | 4/2003 | Kurosawa et al. | |
| 2003/0088398 A1 | 5/2003 | Guo et al. | |
| 2003/0090515 A1 * | 5/2003 | Chang | H04N 5/4401 715/745 |
| 2003/0095102 A1 | 5/2003 | Kraft et al. | |
| 2003/0095104 A1 | 5/2003 | Kandogan et al. | |
| 2003/0101060 A1 | 5/2003 | Bickley et al. | |
| 2003/0104839 A1 | 6/2003 | Kraft et al. | |
| 2003/0119561 A1 | 6/2003 | Hatch et al. | |
| 2003/0144830 A1 | 7/2003 | Williams | |
| 2003/0179930 A1 | 9/2003 | O'Dell et al. | |
| 2003/0193478 A1 | 10/2003 | Ng | |
| 2003/0212563 A1 | 11/2003 | Ju et al. | |
| 2004/0049388 A1 | 3/2004 | Roth et al. | |
| 2004/0052355 A1 | 3/2004 | Awada et al. | |
| 2004/0067762 A1 | 4/2004 | Balle | |
| 2004/0104896 A1 | 6/2004 | Suraqui | |
| 2004/0122666 A1 | 6/2004 | Ahlenius | |
| 2004/0127197 A1 | 7/2004 | Roskind | |
| 2004/0127198 A1 | 7/2004 | Roskind et al. | |
| 2004/0135774 A1 | 7/2004 | La Monica | |
| 2004/0140956 A1 | 7/2004 | Kushler et al. | |
| 2004/0153963 A1 | 8/2004 | Simpson et al. | |
| 2004/0153975 A1 | 8/2004 | Williams et al. | |
| 2004/0155869 A1 | 8/2004 | Robinson et al. | |
| 2004/0163032 A1 | 8/2004 | Guo et al. | |
| 2004/0169635 A1 | 9/2004 | Ghassabian | |
| 2004/0198427 A1 | 10/2004 | Kimbell et al. | |
| 2004/0201607 A1 | 10/2004 | Mulvey et al. | |
| 2004/0203656 A1 | 10/2004 | Andrew et al. | |
| 2004/0243257 A1 | 12/2004 | Theimer | |
| 2004/0259598 A1 | 12/2004 | Wagner et al. | |
| 2004/0267528 A9 | 12/2004 | Roth et al. | |
| 2005/0017954 A1 | 1/2005 | Kay et al. | |
| 2005/0075096 A1 | 4/2005 | Aljuraid et al. | |
| 2005/0080625 A1 | 4/2005 | Bennett et al. | |
| 2005/0114770 A1 | 5/2005 | Sacher et al. | |
| 2006/0007162 A1 | 1/2006 | Kato | |
| 2006/0010206 A1 | 1/2006 | Apacible et al. | |

(56) References Cited

U.S. PATENT DOCUMENTS

| | | |
|---|---|---|
| 2006/0028450 A1 | 2/2006 | Suraqui |
| 2006/0088356 A1 | 4/2006 | Jawerth et al. |
| 2006/0129928 A1 | 6/2006 | Qiu |
| 2006/0136408 A1 | 6/2006 | Weir et al. |
| 2006/0155536 A1 | 7/2006 | Williams et al. |
| 2006/0158436 A1 | 7/2006 | Lapointe et al. |
| 2006/0173807 A1 | 8/2006 | Weir et al. |
| 2006/0190822 A1 | 8/2006 | Basson et al. |
| 2006/0193519 A1 | 8/2006 | Sternby |
| 2006/0236239 A1 | 10/2006 | Simpson et al. |
| 2006/0239560 A1 | 10/2006 | Sternby |
| 2006/0265208 A1 | 11/2006 | Assadollahi |
| 2007/0094718 A1 | 4/2007 | Simpson |
| 2007/0203879 A1 | 8/2007 | Templeton-Steadman et al. |
| 2007/0276814 A1 | 11/2007 | Williams |
| 2007/0285397 A1 | 12/2007 | Lapointe et al. |
| 2008/0086704 A1 | 4/2008 | Aravamudan et al. |
| 2008/0130996 A1 | 6/2008 | Sternby |
| 2008/0235003 A1 | 9/2008 | Lai et al. |
| 2012/0188168 A1 | 7/2012 | Yoon et al. |

FOREIGN PATENT DOCUMENTS

| | | |
|---|---|---|
| EP | 0319193 | 6/1989 |
| EP | 0464726 | 1/1992 |
| EP | 0540147 | 5/1993 |
| EP | 0651315 | 5/1995 |
| EP | 0660216 | 6/1995 |
| EP | 0732646 | 9/1996 |
| EP | 0751469 | 1/1997 |
| EP | 1031913 | 8/2000 |
| EP | 1035712 | 9/2000 |
| EP | 1217792 A1 | 6/2002 |
| EP | 1256875 | 11/2002 |
| EP | 1296216 | 3/2003 |
| EP | 1320023 | 6/2003 |
| EP | 1324573 | 7/2003 |
| EP | 1341156 | 9/2003 |
| EP | 1347361 | 9/2003 |
| EP | 1347362 | 9/2003 |
| EP | 1522920 | 4/2005 |
| GB | 2298166 | 8/1996 |
| GB | 2383459 | 6/2003 |
| JP | 61-282965 | 12/1986 |
| JP | 03-141460 | 6/1991 |
| JP | 1990-117218 | 1/1992 |
| JP | 1993-265682 | 10/1993 |
| JP | 8006939 | 1/1996 |
| JP | 1997-114817 | 5/1997 |
| JP | 1997-134243 | 5/1997 |
| JP | 1997-212503 | 8/1997 |
| JP | 11-312046 | 11/1999 |
| JP | 2000-508093 | 6/2000 |
| JP | 2001-509290 | 7/2001 |
| JP | 2001-224075 | 8/2001 |
| JP | 2001-251395 | 9/2001 |
| JP | 2002-014856 | 1/2002 |
| JP | 2002-014956 | 1/2002 |
| JP | 2002-141996 | 5/2002 |
| JP | 2002-351862 | 12/2002 |
| JP | 2003-116179 | 4/2003 |
| JP | 2003-196273 | 7/2003 |
| TW | 476033 | 2/2002 |
| TW | 559783 | 11/2003 |
| WO | WO-82/00442 | 2/1982 |
| WO | 90/07149 | 6/1990 |
| WO | WO-96/27947 | 9/1996 |
| WO | WO-97/04580 | 2/1997 |
| WO | WO-97/05541 | 2/1997 |
| WO | WO-98/33111 | 7/1998 |
| WO | WO 00/35091 | 6/2000 |
| WO | WO-03/058420 A2 | 7/2003 |
| WO | WO-03/060451 A1 | 7/2003 |
| WO | WO-2004003721 | 1/2004 |
| WO | WO-2004/111812 A2 | 12/2004 |
| WO | WO-2004/111871 A1 | 12/2004 |
| WO | WO-2004110040 | 12/2004 |
| WO | WO-2006/026908 A1 | 3/2006 |

OTHER PUBLICATIONS

"http://pitecan.com/OpenPOBoxlinfo/index.html", Jul. 23, 2001, 1 page.

"Latest Philips Wireless Handset Ships With T9 Text Input in China", Business Wire, www.businesswire.com/webbox/bw.110999/193130342.htm, Nov. 9, 1999, Total of 2 pages.

"Making Multi-tap Intelligent", http://www.zicorp.com/ezitap.htm, retrieved Feb. 7, 2006, 2005, Total of 1 page.

"Motorola Lexicus Technologies & SOK's iTAP page", www.motorola.com/lexicus/html/itap_FAQ.html, retrieved Sep. 6, 2002, 2002, Total of 1 page.

"Novice-to-Novice: Keyboards, Consoles, and VT Cruising", Linux Journal, vol. 1996, Issue 31es, Nov. 1996, 9 pages.

"POBox Server", http://pitecan.com/OpenPOBox/info/index.html, Jul. 23, 2001, Total of 1 page.

"Speed Keyboard for Data Processor", IBM Technical Disclosure Bulletin, vol. 23, Jul. 1980, Total of 3 pages.

"Tapless ppd Gen3.0", http://www.tapless.biz, retrieved from website Feb. 7, 2006, 2006, Total of 1 page.

"Welcome to the Nuance Corporate Website", http://www.nuance.com/, Retrieved on Feb. 7, 2006 from website, 2006, Total of 2 pages.

"What is writing?", http://www.ling.upenn.edu/courses/Fall_2003/ling001/reading_writing.html, Linguistics 001. Lecture 19, Reading and Writing, 2003, Total of 13 pages.

"WordLogic for Handheld Computers", Retrieved from webarchive.org, http://web.archive.org/web/20051030092534/www.wordlogic.com/products-predictive-keyboard-handheld-prediction.asp, Oct. 30, 2005, Total of 1 page.

"Zi Claims Second Patent Victory Against Tegic Communications, a unit of AOL Time Warner", www.zicorp.com/pressreleases/031402.html, News Release from Zi Corporation, Mar. 14, 2002, 1-2.

"Zi Corporation, Inc. v. Tegic Communications, Inc.", www.zicorp.com/pressreleases/031402.html, Summary Judgment Orders, Mar. 13, 2002, 1-7.

Ajioka, Y. , "Prediction of Nexet Alphabets and Words of Four Sentences by Adaptive Injunctions", IJCNN-91-Seattle: Int'l Joint Conference on Neural Networks, Anzai, Y (Additional Author), Cat. No. 91CH3049-4, vol. 2; IEEE, NY, NY USA, 1991, 897.

Arnott, John , "Probabilistic Character Disambiguation for Reduced Keyboards Using Small Text Samples", AAC Augmentative and Alternative Communication, vol. 8, No. 3, Dept. Math & comp. Sci.; Univ of Dundee, Dundee, Tayside, Scotland, Sep. 1992, 215-223.

Butts, L. , "An Evaluation of Mobile Phone Text Input Methods", Conferences in Research and Practice in Information Technology, Cockburn, A. (Additional Author), vol. 7, University of Canterbury, Dept of Computer Science, Christchurch, New Zealand AUIC2002, Melbourne Australia, Australian Computer Society, 2001, Total of 6 pages.

Cockburn, A. , "Evaluating Mobile Text Entry with Fastap™ Keyboard", People and Computers XVII (vol. 2): British Computer Society Conference on Human Computer Interaction, Siresena (Additional Author), Bath, England, 2003, 77-820.

Coppola, P. et al., "Mode: a framework for context-aware mobile applications", In: Proc. of Workshop on Context Awareness Systems, Helsinki University Press, ISBN:952-10-2518-2, 2005, 55-65.

Defrancis, John , "The Ideographic Myth", The Chinese Language: Face and Fantasy, University of Hawi'i Press, Link to chapter: http://www.pinyin.info/readings/texts/ideographic_myth.html, 1984, Total of 13 pages.

Demasco, Patrick W. et al., "Generating Text From Compressed Input: An Intelligent Interface for People with Sever Motor Impairments", Communications of the ACM, vol. 35 No. 5, May 1992, 68-78.

(56) References Cited

OTHER PUBLICATIONS

Dey, A.K., "Towards a better understanding of context and context-awareness", GVU Technical Report, Abowd, G. D. (Additional Author), GVU Center, GIT-GVU-99-2, Atlanta GA, USA, 1999, Total of 12 pages.

Foulds, Richard et al., "Lexical Prediction Techniques Applied to Reduce Motor Requirements for Augmentative Communication", RESNA 10th Annual Conference, San Jose, California, 1987, 115-117.

Foulds, Richard et al., "Statistical Disambiguation of Multi-Character Keys Applied to Reduce Motor Requirements for Augmentative and Alternative Communication", AAC Augmentative and Alternative Communication, 1987, 192-195.

Gavalda, M., "Epiphenomenal Grammar Acquisition with GSG", Proceedings of the Workshop on Conversational Systems of the 6th Conf. on Applied Natural Language Processing and the 1st Conf. of the N. American Chapter of the Assoc. for Computational Linguistics, Seattle, Washington, (ANLP/NAACL-2000), May 2000, Total of 6 pages.

James, Christina et al., "Bringing Text Input Beyond the Desktop", CHI 2000, Seattle, WA, Apr. 1-6, 2000, Apr. 2000, 49-50.

James, Christina L. et al., "Text Input for Mobile Devices: Comparing Model Prediction to Actual Performance", SIGCHI '01, Seattle, WA, Mar. 31-Apr. 4, 2001, ACM 1-58113-327-8/01/0003, 2001, 365-371.

Kamphuis, Harry et al., "Katdas; A Small Number of Keys Direct Access System", RESNA 12th Annual Conference, New Orleans, Louisiana, 1989, 278-279.

King, Martin T. et al., "JustType-Efficient Communication with Eight Keys", Proceedings of the RESNA '95 Annual Conference, Vancouver, BC, Canada, 1995, Total of 3 pages.

Kreifeldt, J.G. et al., "Reduced Keyboard Designs Using Disambiguation", Proceedings of the Human Factors Society 33rd Annual Meeting, 1989, 441-444.

Kronlid, F et al., "TreePredict, Improving Text Entry on PDA's", Proceedings of the Conference on Human Factors in Computing Systems, CHI2001, ACM press, 2001, 441-442.

Kushler, Cliff, "AAC Using a Reduced Keyboard", www.dinf.ne.jp/doc/english/Us_Eu/conf/csun_98/csun98_140.htm, CSUN 98 Papers, Web Posted Mar. 3, 1998, 1998, Total of 4 pages.

Lesher, Gregory W. et al., "Optimal Character Arrangements for Ambiguous Keyboards", IEEE Transactions on Rehabilitation Engineering, vol. 6, No. 4, Dec. 1998, 415-423.

Levine, Stephen H. et al., "Adaptive Technique for Customized Interface Design With Application to Nonvocal Communication", RESNA 9th Annual Conference, Minneapolis, Minnesota, 1986, 399-401.

Levine, Stephen H., "An Adaptive Approach to Optimal Keyboard Design for Nonvocal Communication", IEEE, 1985, 334-337.

Levine, Stephen H. et al., "Computer Disambiguation of Multi-Character Key Text Entry: An Adaptive Design Approach", IEEE, 1986, 298-301.

Levine, Stephen H. et al., "Multi-Character Key Text Entry Using Computer Disambiguation", RESNA 10th Annual Conference, San Jose, California, 1987, 177-178.

MacKenzie, et al., "Text Entry for Mobile Computing: Models and Methods, Theory and Practice", www.yorku.ca/mack/hci3.html, Retrieved Sep. 6, 2002, 2002, Total of 26 pages.

MacKenzie, I. Scott et al., "LetterWise: Prefix-based Disambiguation for Mobile Text Input", UIST '01, Orlando, FL, Nov. 11-14, 2001, ACM 1-58113-438-x/01/11, 2001, 111-120.

Martin, T. et al., "Learning User Models for an Intelligent Telephone Assistant", Proceedings Joint 9th IFSA World Congress and 20th NAFIPS Intnl. Conf., IEEE, vol. 2, Piscataway, NJ, USA, Cat. No. 01TH8569, 2001, 669-674.

Masui, T., "POBox: An Efficient Text Input Method for Handheld and Ubiquitous Computers", Sony Computer Science Laboratories, Apr. 1998, Total of 12 pages.

Matias, Edgar, "Half-QWERTY: Typing With One Hand Using Your Two-Handed Skills", Conference Companion, CHI '94, Apr. 24-28, 1994, Apr. 1994, 51-52.

Minneman, Scott L., "A Simplified Touch-Tone Telecommunication Aid for Deaf and Hearing Impaired Individuals", RESNA 8th Annual Conference, Memphis Tennessee, 209-211, 1985.

Oommen, B. John et al., "String Taxonomy Using Learning Automata", IEEE Transactions on Systems, Mand and Cybernetics—Part B: Cybernetics, vol. 27 No. 20, Apr. 1997, 354-365.

Oommen, B.J. et al., "Correction to 'An Adaptive Learning Solution to the Keyboard Optimization Problem'", IEEE Transactions on Systems, Man and Cybernetics, vol. 22, No. 5, Oct. 1992, 1233-1243.

Oviatt, Sharon, "Mutual Disambiguation of Recognition Errors in a Multimodal Architecture", Chi 99, May 15-29, May 1999, 576-583.

Rosa, J., "A Biologically Motivated Connectionist System for Predicting the Next Word in Natural Language Sentence", IEEEE Intnl Conference on Systems, man and Cybernetics; Conf. Proceedings, Cat. No. 02CH37349, Part vol. 4, p. 6, Yasmine Hammamet, Tunisia, 2002, Total of 2 pages.

Rosa, J., "Next Word Prediction in a Connectional Distributed Representation System", IEEEE Intnl Conference on Systems, man and Cybernetics; Conf. Proceedings, Cat. No. 02CH37349, Part vol. 3, p. 6, Yasmine Hammamet, Tunisia, 2002, Total of 2 pages.

Schmidt, A. et al., "Advanced Interaction in Context", In Proceedings of First International Symposium of Handheld and Ubiquitous Computing, Karlsruhe, Germany, Sep. 1999, 89-101.

Shieber, S., "Abbreviated Text Input", Abbreviated Text Input, Baker, E. (Additional Author), Harvard University, Cambridge, MA, USA shieber@deas.harvard.edu, ellie@eecs.harvard.edu, ACM 1-58113-586-6/03/0001, 2003, 293-296.

Siewiorek, D.P. et al., "SenSay: A context-aware mobile phone", In proceedings of the 7th International Symposium on Wearable Computers, IEEE Press, 2003, 248-249.

Silfverberg, Miika et al., "Predicting Text Entry Speed on Mobile Phones", CHI 2000, The Hague, Amsterdam, Apr. 1-6, 2000, ACM 1-58113-216-6/00/04, Apr. 2000, 9-16.

Smith, Sidney L. et al., "Alphabetic Data Entry Via the Touch-Tone Pad: A Comment", Human Factors, vol. 13 No. 2, Apr. 1971, 189-190.

Sugimoto, Masakatsu et al., "SHK: Single Hand Key Card for Mobile Devices", CHI 1996, Apr. 13-18, 1996, Apr. 1996, 7-8.

Sugimoto, Masakatsu, "Single-Hand Input Scheme for English and Japanese Text", Fujitsu Sci. Tech.J., vol. 33 No. 2, Dec. 1997, 189-195.

Suhm, B. et al., "Multimodal Error Correction for Speech User Interfaces", ACM Transactions on Computer-Human Interaction, vol. 8, Mar. 2001, 60-98.

Swiffin, Andrew L. et al., "Adaptive and Predictive Techniques in a Communications Prosthesis", AAC Augmentative and Alternative Communication, 1987, 181-191.

Swiffin, Andrew L. et al., "PAL: An Effort Efficient Portable Communication Aid and Keyboard Emulator", RESNA 8th Annual Conference, Memphis, Tennessee, 1985, 197 & 199.

Tygran, Amalyan, "T9 or Text Predicative Input in Mobile Telephones", Business Wire, web.archive.org/wweb/20010723054055/http://www.digit-life.com/articles/mobilet9/, Jul. 23, 2001, 1-5.

Witten, I.H., "Principles of Computer Speech", New York: Academic Press, 1982, 246-253.

Xu, Jinxi et al., "Corpus-Based Stemming Using Cooccurrence of Word Variants", CM Transactions on Information Systems, vol. 16 No. 1, ACM 1046-8188/98/0100-0061, Jan. 1989, 61-81.

Yang, Y et al., "A Comparative Study on Feature Selection in Text Categorization", Proceedings of ICML 1997, 1997, 412-420.

Zernik, U., "Language Acquisition: Coping with Lexical Gaps", Proceedings of the 12th International Conference on Computational Linguistics, Budapest, Hungary, 1998, 796-800.

Lashkari et al., "Collaborative Interface Agents", Software Agents: XP 000603576.

\* cited by examiner

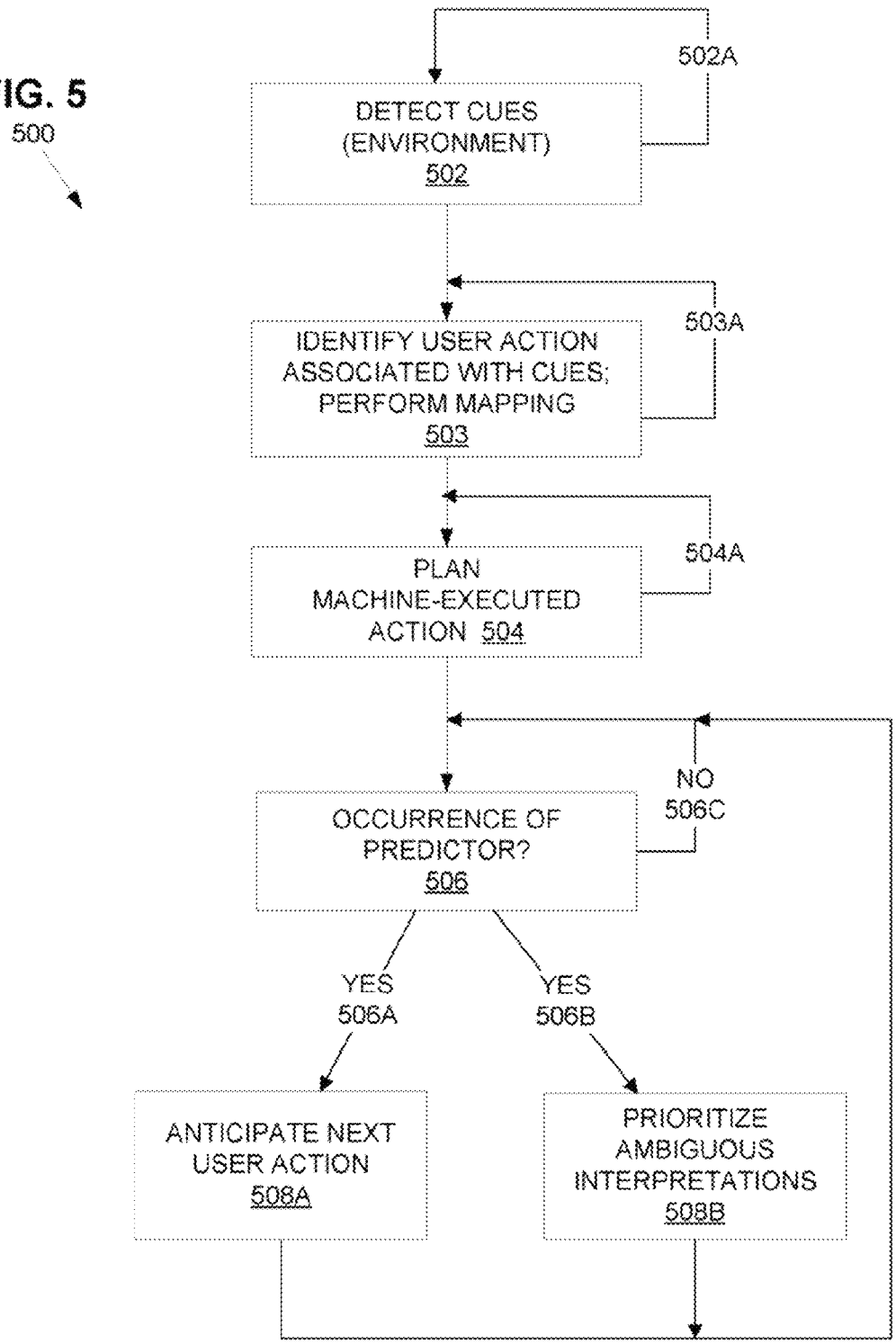

CONTEXTUAL PREDICTION OF USER WORDS AND USER ACTIONS

CROSS REFERENCE TO RELATED APPLICATIONS

This application is a continuation of U.S. patent application Ser. No. 11/379,747, filed Apr. 21, 2006, which claims priority to U.S. provisional patent application Ser. No. 60/734,840, filed Nov. 9, 2005, and which is also a continuation-in-part of U.S. patent application Ser. No. 10/866,634, filed Jun. 10, 2004, which issued on Mar. 16, 2010 as U.S. Pat. No. 7,679,534, which is a continuation-in-part of U.S. patent application Ser. No. 10/176,933, filed Jun. 20, 2002, which issued on May 4, 2010 as U.S. Pat. No. 7,712,053, and which also claims priority to U.S. provisional patent application Ser. No. 60/504,240, filed Sep. 19, 2003, and which is also a continuation-in-part of U.S. patent application Ser. No. 09/454,406, filed Dec. 31, 1999, which issued on Nov. 11, 2003 as U.S. Pat. No. 6,646,573, which claims priority to U.S. provisional patent application Ser. No. 60/110,890, filed Dec. 4, 1998, each of which application is incorporated herein in its entirety by this reference thereto.

BACKGROUND

Technical Field

This invention relates to handheld computing devices. More particularly, the invention concerns a handheld computing device operable to automatically detect cues describing the device's environment and user actions performed with the device, learn which cues and cue combinations are relevant to predict user actions, and then in response to occurrence of the relevant cues, predictively implementing the appropriate user action or configuring the device in anticipation of user action.

Description of Related Art

For many years, portable computers have been getting smaller and smaller. Tremendous growth in the wireless industry has produced reliable, convenient, and nearly commonplace mobile devices such as cell phones, personal digital assistants (PDAs), global positioning system (GPS) units, etc. To produce a truly usable portable computer, the principle size-limiting component has been the keyboard.

To input data on a portable computer without a standard keyboard, people have developed a number of solutions. One such approach has been to use keyboards with less keys ("reduced-key keyboard"). Some reduced keyboards have used a 3-by-4 array of keys, like the layout of a touch-tone telephone.

As a completely different approach, some small devices employ a digitizing surface to receive users' handwriting. This approach permits users to write naturally, albeit in a small area as permitted by the size of the portable computer. Based upon the user's contact with the digitizing surface, handwriting recognition algorithms analyze the geometric characteristics of the user's entry to determine each character or word.

As still another approach for inputting data using small devices without a full-sized keyboard, there are touch-sensitive panels on which some type of keyboard overlay has been printed, or a touch-sensitive screen with a keyboard overlay displayed. The user employs a finger or a stylus to interact with the panel or display screen in the area associated with the desired key or letter.

Aside from data entry, some portable computers recruit these technologies so that users can perform functions beyond data entry, such as operating menus, configuring application programs and hardware, issuing commands, and other GUI functions. These functions may further require different hardware or software devices such as designated pushbuttons, touch screen operated menu areas, rocker switches, hand-operated cursors, and the like.

Despite the absence of normal user interfaces like a full-size keyboard and mouse, then, the foregoing technologies make it quite feasible for users to fully interact with a portable computer of reduced size. Although feasible, this user-machine interaction is unavoidably burdened with greater potential delay, error, and difficulty of use, owing to the small sized user interface. Consequently, designers are continually searching for new technologies to make the interface more rapid, accurate, and natural.

SUMMARY

Broadly, an operating sequence manages a handheld computing to automatically detect cues describing the device's environment and user actions performed with the device, learn which cues and cue combinations are relevant to predict user actions, and then in response to occurrence of the relevant cues, predictively implementing the appropriate user action or configuring the device in anticipation of user action.

The teachings of this disclosure may be implemented as a method, apparatus, logic circuit, signal bearing medium, or a combination of these. This disclosure provides a number of other advantages and benefits, which should be apparent from the following description.

BRIEF DESCRIPTION OF THE DRAWINGS

FIG. 5 is a flowchart of a different operational embodiment for a computing device.

DETAILED DESCRIPTION

Introduction

One aspect of this disclosure concerns user entry of information into a system with an input device. A scheme is provided in which an entire word that a user wants to enter is predicted after the user enters a specific symbol, such as a space character. If the user presses an ambiguous key thereafter, rather than accept the prediction, the selection list is reordered. For example, a user enters the phrase "Lets run to school. Better yet, lets drive to "."" After the user presses the space, after first entering the second occurrence of the word "to," the system predicts that the user is going to enter the word "school" based on the context in which the user has entered that word in the past. Other predictions may be available if the user had previously entered text with the same context (for example, "to work", "to camp"). These predictions are presented if the user presses the "next" key; the key specified for scrolling through the list. Should the user enter an ambiguous key after the space, then a word list is reordered to give precedence to the words that match context. For example, if the user presses the ambiguous key that contains the letters 'a', 'b', and 'c', the word "camp" is given precedence in the list.

The disclosed system can also make predictions on other forms of context, such as the person to whom the message is sent, the person writing the message, the day of the week, the time of the week, etc. In another embodiment, rather than explicitly define the context parameters, such as sender/recipient/email/SMS/reply/forward/new email etc, the system is passed a series of parameters by the device which may or may not be relevant and the system learns which of the parameters are relevant for prediction and which ones are not. In other embodiments, prediction may go beyond words and predict phrases. Prediction also may depend on grammar, semantics etc. Other embodiments contemplate anticipation of user actions, as well as words and phrases, such as a user action in connection with menu items, or a user action in connection with form filling. In further embodiments, the knowledge gained from user patterns can be uploaded/downloaded and/or served from a server allowing this information to be shared between devices and applications.

Discussion

For purposes of the discussion herein, with regard to the contextual completion of words, the term 'Next Word Prediction' (NWP) includes, inter alia:

1) Predicting, after entering a space character, the entire next word that the user wants to enter, and 2) If the user presses an ambiguous key, rather than accept the prediction, the selection lists are reordered.

Figure 1:
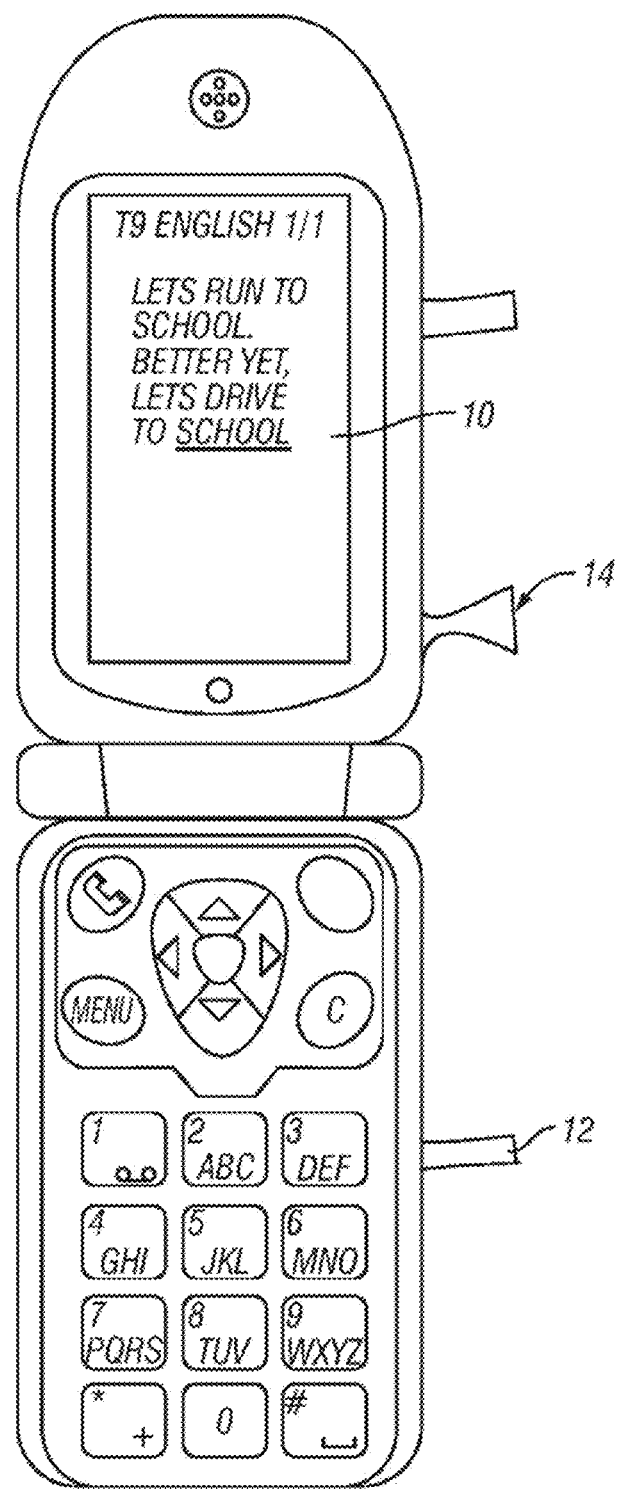
FIG. 1 is a block diagram showing a plan exterior view of a computing device.

FIG. 1 is a schematic representation of a device 14 having a display 10 and user information input mechanism 12, and that incorporates next word prediction technology as disclosed herein. In FIG. 1, the user has entered the phrase "Lets run to school. Better yet, lets drive to." The user presses space after entering the word "to," and the system predicts that the user is next going to enter the word "school," based on the context in which the user has entered the word "school" in the past. In this case, only the previous word for the context is looked at. The last time the user entered the word "to," he entered the word "school" directly after. In the example of FIG. 1, the user has entered the word "to" again, and the prediction word "school" is present. If in the past the user had entered other words after the word "to," those additional predictions are provided, as well, in a list, for example. In this example, context information comes from previous text entered in this message only. In one embodiment, context information is compiled from text entered in prior messages/sessions as well.

Predictions are made when the context in the current message matches the context in text the user previously entered. The concept of context can be very general. Context can mean the nature of the text entered. Context can also be combined with other contexts, such as, for example:

a) The person to whom a message is sent;

b) The person writing the message;

c) The day of the week;

d) The time of day.

Finally, the prediction system might not know what the most important factors are for context, e.g. are they:

Text and message recipient?;

Text and message writer?;

All three?.

A further embodiment starts with a very broad set of possible factors and performs on-the-fly factor analysis of the user behavior to determine the most effective factor to include as context. This system does more than adapt to user behavior based on a priori specified factors, such as text, recipient, author, day, that are recorded, but is also intelligent enough to determine which factors are most important and emphasize those. This allows for better prediction.

Another example of prediction is based upon time of day. For example, when entering a message "let's meet for" at lunchtime, the word "lunch" is automatically predicted as the next word in the phrase. Later in the day the word "dinner" is predicted. The phrases stored also can have time of day associated with them as one of their attributes. This can be used to decide which phrases are relevant when the user is entering text.

Prediction of User Actions

Prediction can also be applied to other concepts as well, such as menus and user actions. When a user clicks a menu, the context module is provided with a keyword for that menu as the preceding context word. The context module then produces the entries previously selected from that menu because they are in the context database as entries preceded by that keyword, and those words can be re-ordered to the top of the menu. When a menu entry is selected, the context module then automatically notes it as having occurred with the menu tag as context for re-ordering to the front next time.

For example, when the user clicks the "Edit" menu, the context module is provided "Edit:" as context. If the last time a user clicked "Edit" the user chose "Find," then "Find" is shown at the front of the menu. If the user moves past that to "Replace," then a use of "Replace" in the context of "Edit:" is marked, so that the next time the user selects the "Edit" menu, "Replace" becomes the first entry, followed by "Find" and the other less-frequently used entries.

Note that for cell phones with limited screen space, moving commonly used entries to the front of a menu can make them immediately visible when they otherwise are not visible without scrolling.

In one embodiment, learning is used, in simple case context and reorder, to predict the next macro-level user interface (UI) behavior the user is expected to perform. Instead of reordering menus based on past usage, the normal menu format is superseded entirely by reordering immediate options for the next state/application the user is expected to go to, and the most likely option can be performed automatically, if desired.

For example, consider the situation where the system knows that whenever a user is in the settings mode on the phone, and they are choosing an input method or language, they are very likely to move next to their favorite messaging application. Then, instead of presenting the user with the normal menu tree to get to the messaging application, the system:

a) Goes there automatically, or if that is found to not be feasible;

b) Presents that as a visible prominent option right there in the settings window, along with the next most likely option.

The last option would be "go to standard menu tree." This way, the user is presented with the most likely next end state, rather than the most likely behavior directly from here, which in a normal phone would be going back to the menu tree. The user does not have to navigate a menu tree at all, but rather has one click (or no click) to go to the next task.

Additional embodiments apply to contexts that, for example pose any of the following questions:

What end state is the user most likely to be in immediately after a messaging application?
What end state is the user most likely to be in after entering something into a phonebook?
What end state is the user most likely to be given the last two places he was?
Given the time of day?
Should a factor analysis be performed on the fly to isolate the most relevant factor's involved in deciding what the next move should be?

Forms

Form filling is another useful function, which may be performed by the disclosed system. Context sensitivity by field attribute, e.g. date only predicts months, day switches to numeric mode etc. This can similarly be applied to form input. The browser, or other form-input software, can provide the prompt for the input cell as context for text entry of the cell. Thus, for example, when a form prompts for "Name:" the user's name is available with few to no keystrokes, and other names he might fill in on forms are also made easier to enter.

Implementation of Contextual Word Prediction into Tegic T9 Technology

As one example, next word prediction according to the present disclosure may be applied to Tegic Corporation's T9® technology. Broadly, T9 technology combines the groups of letters found on each key of an input device, e.g. each phone key, with a fast-access dictionary of words, and recognizes what a user wants to input as text as he types. T9 technology offers the most commonly-used word for every key sequence entered by default and then lets the user access other choices with one or more presses of the NEXT or space key. Some basic features of Tegic's T9 technology are described in the following references, which are incorporated by reference: U.S. Pat. Nos. 6,011,554 and 5,818,437.

The following discussion makes numerous citations to "T9" technology and "T9" systems. Although T9 is a trademark, and certain products and earlier patents contain features marked under this mark, the present disclosure's citations to "T9" refer to represent a novel implementation of technology, and namely, the introduction of certain new features in the context of existing T9 technology. Accordingly, "T9" is not used as a reference to admitted prior art.

Figure 2:
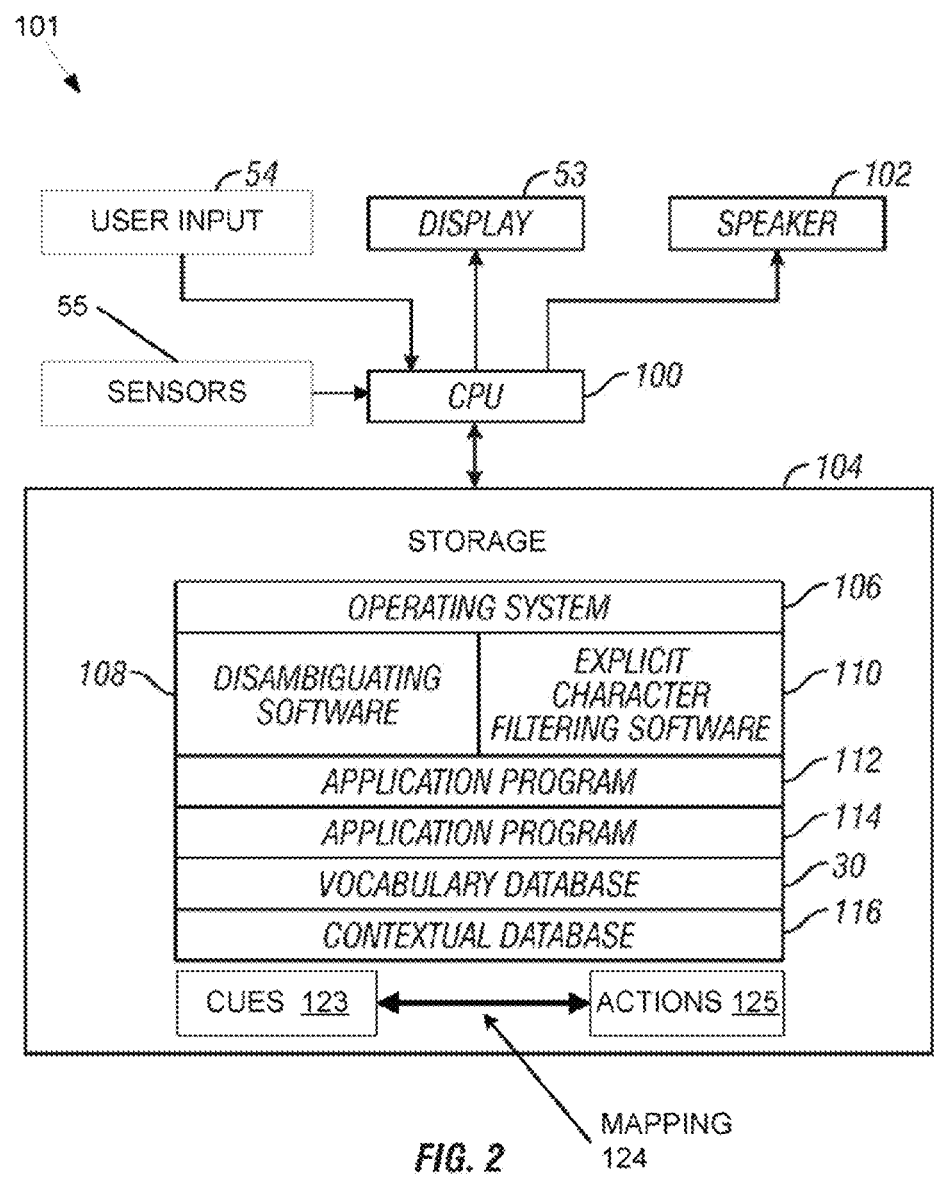
FIG. 2 is a block diagram showing hardware, software, and interconnections of a computing device.

FIG. 2 shows a block diagram of the various subcomponents and interconnections of a handheld computing device 101. In one example, the device 101 may be implemented as a reduced keyboard disambiguating system. A user input 54 and the display 53 are coupled to a processor 100 through appropriate interfacing circuitry. Optionally, a speaker 102 is also coupled to the processor.

Another optional component includes one or more sensors 55, similarly coupled to the CPU 100. The sensors 55 may include some or all of the following: infrared and/or visible light meters, accelerometers, touch or pressure sensors, GPS engines, Carbon Dioxide sensors, temperature measuring devices, sound measuring equipment, and any other equipment to determine the magnitude, pattern, frequency, nature, or other characteristics of any measurable physical properties that may be indicative of the environment in which the user is operating the device. Appropriate interface circuitry is included in the sensors 55 or CPU 100 or between them, with some examples including one or more analog-to-digital converters, amplifiers, multiplexers, etc. The various sensors 55 may be integrated into the device 101, located externally and coupled to the device 101, removably coupled to the device 101, or a combination of these or other options.

The user input 54 comprises a keyboard, telephone or other style keypad, soft keyboard, screen overlay keyboard, mouse, trackball, handwriting digitizing surface, or any other means for the user to communicate input into the machine 101. Without any intended limitation, the ensuing discussion uses an example where the input device 54 is a keyboard. In this embodiment, the processor 100 receives inputs from the keyboard, and manages all output to the display and speaker. The processor 100 is coupled to digital data storage 104. The storage 104 includes a combination of temporary storage media, such as random access memory (RAM), and permanent storage media, such as read-only memory (ROM), floppy disks, hard disks, or CD-ROMs. The storage 104 contains all software routines necessary to govern system operation. In one example, the memory contains an operating system 106, disambiguating software 108, associated filtering of ambiguous text entry software and/or extending and interpreting software 110, and a contextual database 116, the latter of which is discussed in additional detail below. The memory also includes a vocabulary database 30. Optionally, the memory may contain one or more application programs 112, 114. Examples of application programs include word processors, software dictionaries, and foreign language translators. Speech synthesis software may also be provided as an application program, thereby allowing the reduced keyboard disambiguating system to function as a communication aid. Therefore, the output, in this case, might be vocally output from the speaker.

In certain embodiments, the storage 104 includes cues 123, actions 125, and a mapping 124 between the two. Broadly, the cues 123 describe environment of the device 101 and user performed actions of configuring the device and operating its application programs. The actions 125 represent associated user actions involving the device 101. The nature, meaning, and characteristics of the cues 123 and actions 125 are described in greater detail below in conjunction with the details operation of the system of FIG. 2. The cues 123 and actions 125 may be embodied in one or more linked lists, tables, relational databases, alphanumeric data streams, disk sector, file, physical or logical storage device, or any other useful storage construct. As discussed in greater detail below, the cues 123 and actions 125 are related to the process of automatically detecting cues describing the device's environment and user actions performed with the device, learning which cues and cue combinations are relevant to predict user actions, and then in response to occurrence of the relevant cues, predictively implementing the appropriate user action or configuring the device in anticipation of user action.

One aspect of the discussion herein concerns to symbols and sequences of symbols, which, when combined, make an object or part of an object. A typical example of a symbol is a character in any language, such as a letter, digit, punctuation mark, or any other symbol from a language. A typical example of an object or part of an object is a word or part of a word. However, the discussion herein equally applies to Japanese kana and Korean jamos. Also, it should be noted that the objects do not have to be linguistic, as the claimed disambiguating system herein can be used to predict icons, phone numbers, or inventory records, as long as a type of symbolic string representation is present. Therefore, it should be appreciated that use of the terms such as letter, word, word stem, and the like are not limited to only those applications, and are used to facilitate ease of reading and understanding the discussion herein.

For purposes of the discussion herein, T9 systems comprise at least three components:

An integration layer. This component contains the user interface (UI) and handles communications between the device and the T9 core. Communications can occur either through an event-based or a function-based API, discussed below.

A core engine, for example the core engine known as the T9 core, which is provided by Tegic.

One or more language databases (LDBs). Each LDB contains information on a particular language. T9 uses this information to generate lists of words for that language. LDBs can include, for example, any of Alphabetic T9 LDBs, Chinese T9 LDBs, and Korean T9 LDBs.

Supplemental Databases

Alphabetic T9 and Chinese T9 implementations can include the following supplemental databases:

User Database (Alphabetic T9). An Alphabetic T9 UDB contains custom words entered by the user. Typically, these are words that cannot be generated by the LDB, such as names, e-mail addresses, and instant messaging IDs. The database also contains information on how frequently a user selects words—both custom words and words from the LDB.

Context Database (Alphabetic T9). An Alphabetic T9 CDB contains information on the words the user has previously entered. T9 requires this information for its next-word prediction and CDB word completion features. The context database contains recently entered words. Alphabetic T9 uses this information to provide predicted and completed words in the selection list, and to reorder full and completed words in the selection list.

Manufacturer Database (Alphabetic T9). An Alphabetic T9 MDB contains words one wants to make available to T9 users but which typically cannot be generated by the LDB. MDB entries can include geographic locations, stock ticker symbols, and URLs.

Chinese User Database (Chinese T9). A Chinese T9 CUDB contains user-entered character phrases, i.e. strings of Chinese characters that together form a phrase.

Chinese Automatically Reordering User Database (Chinese T9). A Chinese T9 CAUDB contains recently entered characters from a Chinese T9 LDB.

Generating Selection-List Words

When the user enters an active key sequence, Alphabetic T9 checks its databases (LDB, UDB, CDB, and MDB) for words that match the key sequence.

The Alphabetic T9 selection list is designed to provide the words a user most likely desires, based on 1) how frequently the user enters the word, 2) how common the word is in the language and 3) the previous context in which the keys were entered, so that the words appear at the beginning of the selection list.

The relative order of selection-list items depends on which databases are enabled and which features, such as selection list reordering and word completion and word prediction, are enabled.

The first word in Alphabetic T9's selection list is active by default. The term active word refers to the currently active selection-list word.

An example of the selection list order is given below. It is assumed that keys have been entered and no T9 database or database features are disabled.
1) CDB words of length of key sequence.
2) Reordered (highly used) LDB and Custom user words of length of key sequence.
3) Top LDB words of length of key sequence.
4) Less commonly used Custom words of length of key sequence.
5) Less commonly used Manufacturer (MDB) words of length of key sequence.
6) Remaining LDB words of length of key sequence.
7) CDB words that are longer than entered key sequence (these are completed by T9).
8) Custom and manufacturer words that are longer than entered key sequence (these are completed by T9).
9) Words that are result of multiple database lookups. These are attempts to match URLs and other long sequences.

Processing an Accepted Word

When the user accepts the active word by moving the cursor off the word (pressing keys that correspond to the T9 key values T9KEYRIGHT, or T9KEYLEFT) Alphabetic T9:

Adjusts the word's selection frequency value if it is in the UDB as a custom word.

Adjusts the word's selection frequency value if it is in the LDB and Alphabetic T9's selection list reordering feature has not been disabled.

When the user accepts the active word by entering a space (pressing keys that correspond to the T9 key value T9KEYSPACE) Alphabetic T9 performs the actions above, as well as the following actions:

Adds to the UDB as a custom word all the characters between the newly entered space and the one before it, if the UDB and LDB do not already contain the word.

Adds to the CDB all the characters between the newly entered space and the one before it.

Data Processing Components

As discussed above, some hardware aspects of the present disclosure concern the device of FIG. 1 and the system of FIG. 2. In each of FIGS. 2-3, there are various subcomponents, each of which may be implemented by one or more hardware devices, software devices, a portion of one or more hardware or software devices, or a combination of the foregoing. The makeup of these subcomponents is described in greater detail below, with reference to an exemplary digital data processing apparatus, logic circuit, and signal bearing medium.

Exemplary Digital Data Processing Apparatus

As mentioned above, data processing entities of this disclosure may be implemented in various forms. One example is a digital data processing apparatus, as exemplified by the hardware components and interconnections of the digital data processing apparatus 200 of FIG. 2A.

The apparatus 200 includes a processor 202, such as a microprocessor, personal computer, workstation, controller, microcontroller, state machine, or other processing machine, coupled to digital data storage 204. In the present example, the storage 204 includes a fast-access storage 206, as well as nonvolatile storage 208. The fast-access storage 206 may comprise random access memory ("RAM"), and may be used to store the programming instructions executed by the processor 202. The nonvolatile storage 208 may comprise, for example, battery backup RAM, EEPROM, flash PROM, one or more magnetic data storage disks such as a "hard drive", a tape drive, or any other suitable storage device. The apparatus 200 also includes an input/output 210, such as a line, bus, cable, electromagnetic link, or other means for the processor 202 to exchange data with other hardware external to the apparatus 200.

Despite the specific foregoing description, ordinarily skilled artisans (having the benefit of this disclosure) will recognize that the apparatus discussed above may be implemented in a machine of different construction, without departing from the scope of the invention. As a specific example, one of the components 206, 208 may be eliminated; furthermore, the storage 204, 206, and/or 208 may be provided on-board the processor 202, or even provided externally to the apparatus 200.

Signal-Bearing Media

In carrying out the data processing aspects of this disclosure, various of these may employ one or more computer-readable signal-bearing media. Such media tangibly embody a program of machine-readable instructions executable by a digital processing apparatus as described below. In one example, the machine-readable instructions are executable to carry out various functions related to this disclosure, such as the operations described in greater detail below. In another example, the instructions upon execution serve to install a software program upon a computer, where such software program is independently executable to perform other functions related to this disclosure, such as the operations described below.

Figure 2A:
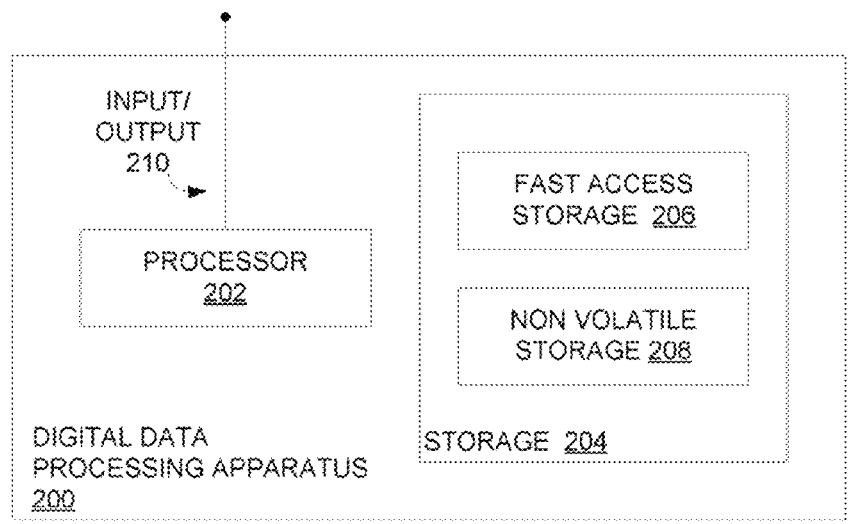
FIG. 2A is a block diagram of a digital data processing machine.
Figure 2B:
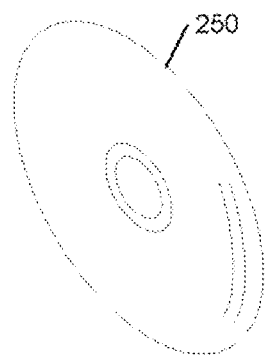
FIG. 2B shows an exemplary signal-bearing medium.

In any case, the signal-bearing media may take various forms. In the context of FIG. 2A, such a signal-bearing media may comprise, for example, the storage 204 or another signal-bearing media, such as an optical storage 250 of FIG. 2B, directly or indirectly accessible by a processor 202. Whether contained in the storage 206, disc 250, or elsewhere, the instructions may be stored on a variety of machine-readable data storage media. Some examples include direct access storage (e.g., a conventional "hard drive", redundant array of inexpensive disks ("RAID"), or another direct access storage device ("DASD")), serial-access storage such as magnetic or optical tape, electronic non-volatile memory (e.g., ROM, EPROM, flash PROM, or EEPROM), battery backup RAM, optical storage (e.g., CD-ROM, WORM, DVD, digital optical tape), or other suitable machine readable signal-bearing media.

Logic Circuitry

Figure 2C:
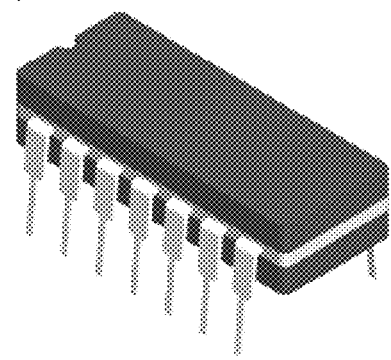
FIG. 2C is a perspective view of exemplary logic circuitry.

In contrast to the signal-bearing media and digital data processing apparatus discussed above, a different embodiment of this disclosure uses logic circuitry instead of computer-executed instructions to implement various processing aspects. FIG. 2C shows an example of logic circuitry in the form of an integrated circuit 260.

Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS, TTL, VLSI, or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

Operations

Having described various structural features of the present disclosure, the operational aspects of the disclosure will now be described.

Predicting the Next Word

Figure 3:
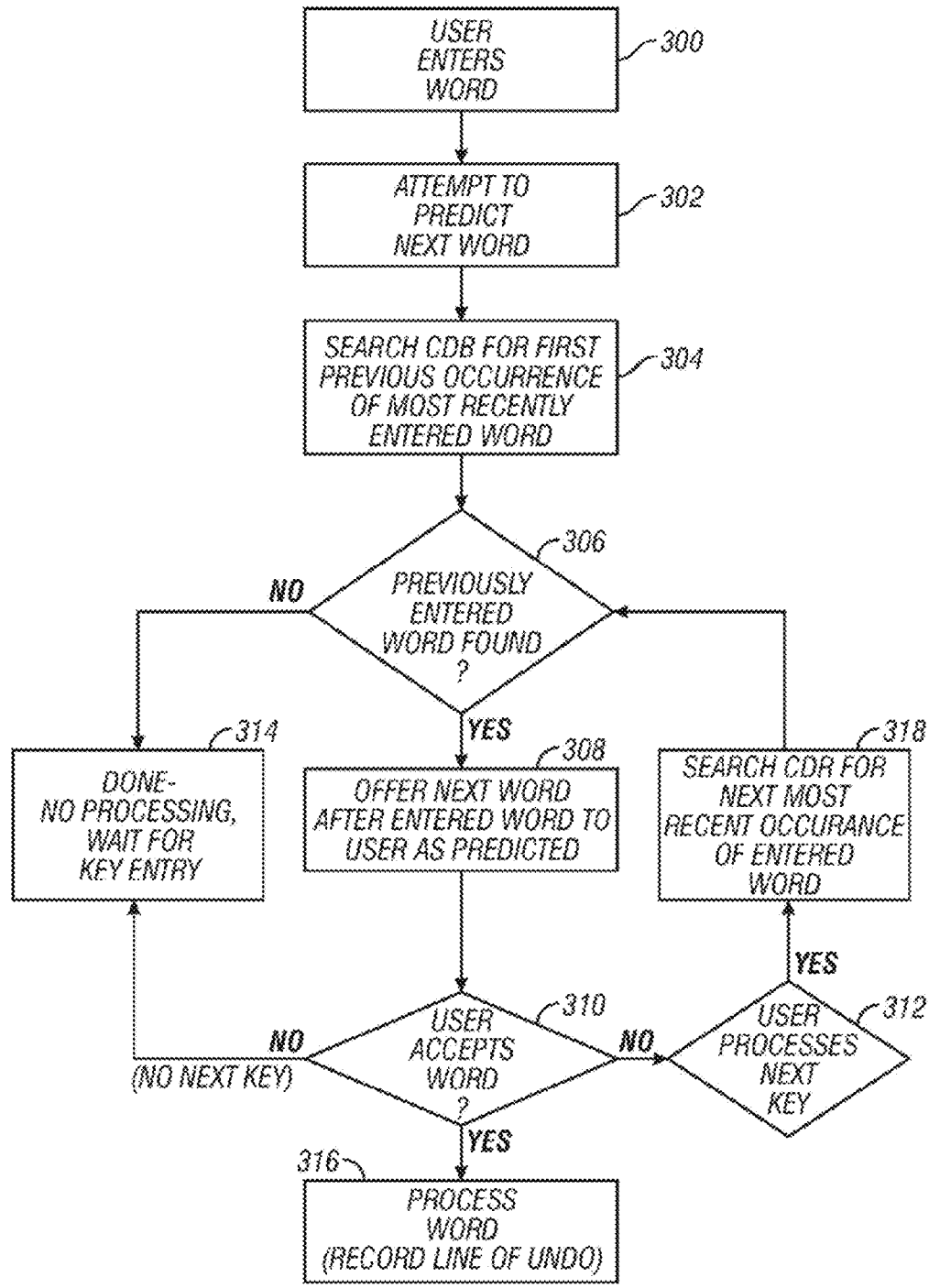
FIG. 3 is a flow diagram showing a next word prediction method.

FIG. 3 is a flow diagram showing an exemplary next word prediction method. As text is entered, the words are stored in the CDB in the order in which they were entered by the user. When the user enters a word (300), Alphabetic T9 attempts to predict the next word desired (302) if the implementation includes a CDB. Alphabetic T9 searches the CDB (304) for the first previous occurrence of the most recently entered word. If Alphabetic T9 finds the word (306), whatever word appears after it in the database is offered to the user as a predicted word (308). If the word is not found (306), processing is complete and T9 waits for next key entry (314). If the predicted word is accepted by the user (310) the word is processed; T9 records use of word (316). If the user does not accept the word (310), but presses the 'next' key (312), the CDB is searched for the next most recent occurrence of the word just entered (318). If found, the word following it in the database is presented as a prediction (306 and 308). If the user does not accept the word (310), and does not press the next key, no processing is complete, and T9 waits for next key entry (314), as further described in connection with FIG. 4.

Alphabetic T9 creates a selection list of predicted words. The maximum number of predicted words in the selection list depends on the literal value of the #define constant T9MAXCDBMATCHES. Unless a different value is assigned, this constant is set to 6.

The user selects and accepts a predicted word using the same process used in T9 for selecting and accepting a word. After the user accepts a predicted word (310), Alphabetic T9 processes the word (316) (312). It will be appreciated by those skilled in the art that the disclosed system may be applied to other disambiguation systems than T9, as well as other forms of T9 than Alphabetic T9.

Processing Words

Figure 4:
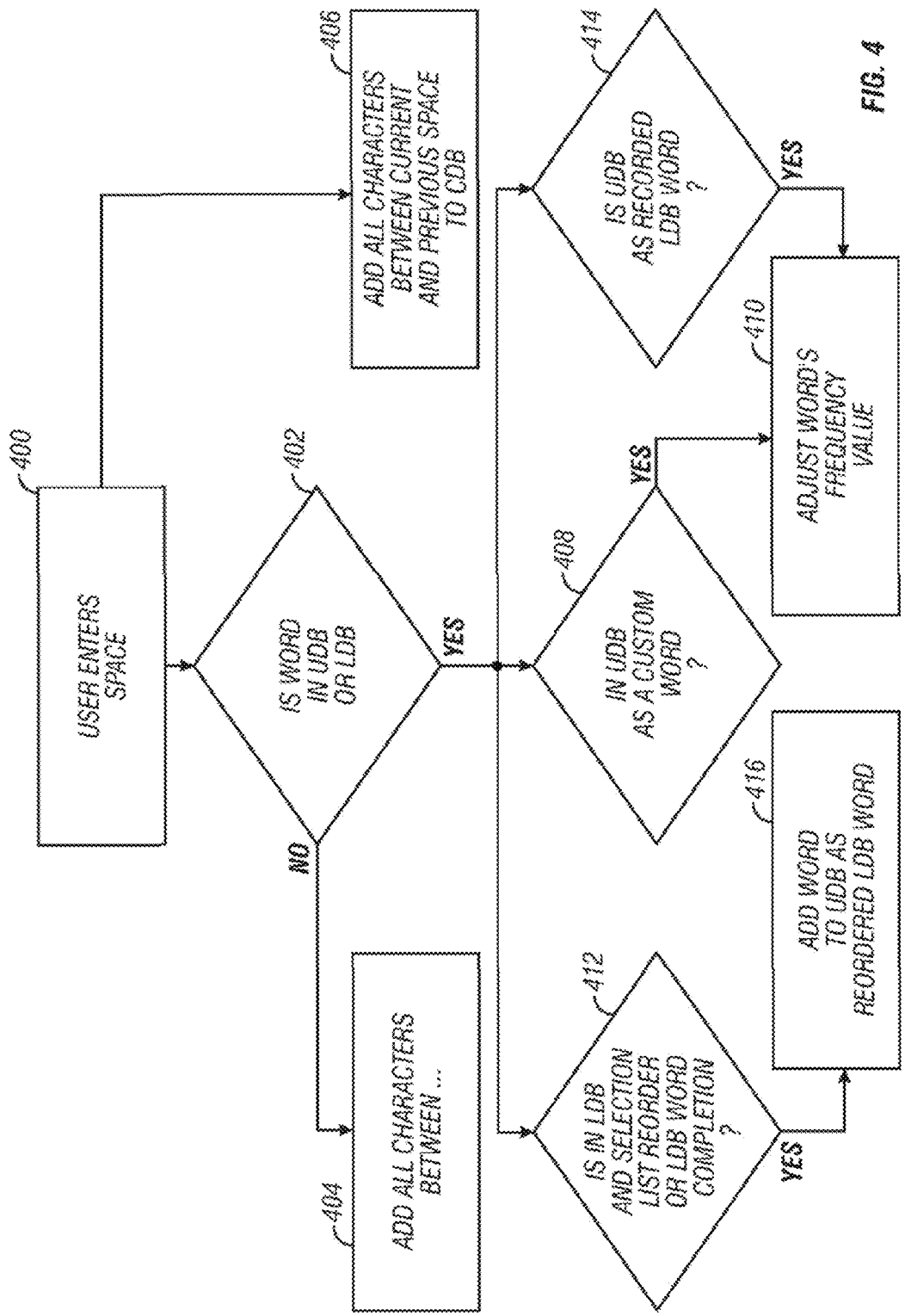
FIG. 4 is a flow diagram showing the processing of words in a next word prediction method.

FIG. 4 is a flow diagram showing the processing of words in an exemplary next word prediction method. When the user presses the Space key (400), to indicate the start of a new word, Alphabetic T9:

Adds to the UDB as a custom word (404) all the characters between the newly entered space and the one before it, if the UDB and LDB do not already contain the word (402).

Adds to the CDB all the characters between the newly entered space and the one before it (406).

Adjusts the word's selection frequency value (410) if it is in the UDB as a custom word (408).

Adjusts the word's selection frequency value (410) if it is in the UDB as a LDB reordered word (414).

Adds the word to UDB as LDB reordered word (416) if it is in the LDB and

Alphabetic T9's selection list reordering or LDB word completion features have not been disabled (412).

Alphabetic T9 Context Database

The following discussion describes an example of how to implement and operate an Alphabetic T9 Context Database (CDB). A CDB contains information on recently entered words. Alphabetic T9 uses this information to include predicted and completed words in the selection list. Whereas Alphabetic T9 checks its other databases only for words that match the current active key sequence, Alphabetic T9 also checks the CDB for the most recently accepted word, i.e. the most recently entered non-active word. CDB words do not necessarily have to match the active word to be included in the selection list. For predicted words, which appear only when there is no active key sequence (in one embodiment), the CDB match depends on the word before the active word. For completed CDB words, the match depends on both the word before the active word and the key sequence of the active word.

If Alphabetic T9 finds in the CDB the word the user has entered, Alphabetic T9 suggests the word that immediately follows in the CDB as a predicted word. For example, if the CDB contains the word pair "text message" and the user enters the word "text" and then presses the Space key, Alphabetic T9 places "message" in the selection list as a predicted word.

Also, if Alphabetic T9 finds in the CDB the word the user has entered, Alphabetic T9 suggests the word that immediately follows in the CDB as a completed word if the word matches the active key sequence, although the completed word contains additional characters. For example, if the CDB contains the word pair "text message" and the user enters the word "text," adds a space, and then enters the key sequence 6-3-7-7, which corresponds to the first four letters in the word "message", Alphabetic T9 places "message" in the selection list as a completed word.

In one embodiment, CDB word completion operates independently of UDB custom-word completion, LDB word completion, and MDB word completion.

Implementing a CDB

To implement an Alphabetic T9 CDB, the integration layer should:
1. Allocate persistent memory for the database.
2. Call T9AWCdbActivate to activate the CDB.
3. Indicate the CDB's size.
4. Reset the database, if desired.
5. Indicate that the integration layer writes data to the database, if necessary.
6. Disable next-word prediction, if desired.
7. Disable CDB word completion, if desired.
8. Handle requests submitted by T9.
9. Copy the database to persistent memory after T9 termination.

The implementation process described above assumes the CDB is stored in non-volatile memory and that CDB data are copied to RAM before activating CDB operations. If a different storage model is used, some of the steps above may not apply.

Allocating Persistent Memory

The integration layer must allocate persistent memory to store the CDB. When the integration layer activates CDB operations by calling T9AWCdbActivate, it copies the CDB from persistent memory to RAM. The database is referenced as an instance of the CDB Data Structure (T9AWCdbInfo).

Activating CDB Operations

If there is no existing CDB, e.g. the first time CDB operations are activated on the device, the integration layer must initialize all T9AWCdbInfo structure fields values to 0. If the integration layer has copied an existing CDB from persistent memory to RAM, it should not modify any T9AWCdbInfo structure field values.

The integration layer activates CDB operations by calling T9AWCdbActivate. When the integration layer calls this function, it provides a pointer to an instance of the CDB Data Structure (T9AWCdbInfo) for which it has allocated memory.

After the integration layer has activated enabled CDB operations, Alphabetic T9 automatically searches the CDB. The type of information Alphabetic T9 searches the CDB for depends on whether there is an active key sequence:
If there is an active key sequence, Alphabetic T9 searches the CDB for words that match the key sequence.
If there is no active key sequence, Alphabetic T9 searches the CDB for the most recently entered word. Alphabetic T9 requires this information for next-word prediction.

Indicating a CDB's Size

A CDB's size is indicated by the value of T9AWCdbInfo.wDataSize. The wDataSize field indicates the total size of T9AWCdbInfo. This includes the data area, where CDB data are stored, several related variables used by T9, and any structure-padding bytes added by the compiler environment.

If T9's Function API is used, it is not necessary to set the value of T9AWCdbInfo.wDataSize directly. Instead, the size of the CDB data area is provided as an argument to the function T9AWCdbActivate. While handling the function, T9 sets the value of T9AWCdbInfo.wDataSize.

One can make the CDB area as large wanted, but it must be at least T9MINCDBDATABYTES bytes. It is recommended, however, that the CDB be 1800*T9SYMBOLWIDTH bytes in size.

Resetting the CDB

When the integration layer activates CDB operations, Alphabetic T9 ensures the integrity of the database by:
Ensuring the CDB is the same size that T9 is expecting.
Verifying that the CUDB is at least T9CCUDBMINSIZE bytes in size and is an even number of bytes.
Verifying that the CDB uses the same character encoding as the LDBs.

If Alphabetic T9 detects a problem, it resets the CDB, which deletes all CDB data. This process occurs without any action by the integration layer, and Alphabetic T9 does not notify the integration layer that the CDB has been reset. The integration layer can explicitly reset the CDB by calling T9AWCdbReset. Under most circumstances, the integration layer does not need to call this function.

Indicating the Integration Layer Writes Data to the CDB

If the CDB is stored in a memory area that Alphabetic T9 cannot write to, the integration layer must write data to the database. Also, one may wish to have the integration layer write data to the CDB if it is desired to monitor what is written to the database or maintain a shadow copy of the CDB in non-volatile storage.

The integration layer informs Alphabetic T9 that it writes data by calling T9AWSetCdbWriteByOEM.

After the integration layer calls this event, Alphabetic T9 requests that the integration layer write data by calling T9REQCDBWRITE. If it is no longer necessary for the integration layer to write data to the CDB, the integration layer calls T9AWClrCdbWriteByOEM to indicate that Alphabetic T9 can write data directly.

Disabling Next-Word Prediction

When CDB operations are activated, T9 by default provides predicted words, i.e. words the user may want to enter, based on the words the user has already entered. Next-word prediction is available in both Ambiguous and Multitap text-entry modes.

Alphabetic T9 places predicted words in the selection list when the word the user has just entered is found in the CDB as the first part of one or more word pairs. Whatever word appears in the CDB after each instance of the word the user has just entered is provided as a predicted word.

It is possible to disable this functionality if one wants to use only CDB word completion, and not next-word prediction, in an Alphabetic T9 implementation. To disable CDB word completion, the integration layer calls T9AWClrCdbPrediction. To re-enable next-word prediction, the integration layer calls T9AWSetCdbPrediction.

Disabling CDB Word Completion

When CDB operations are activated, Alphabetic T9 by default places in the selection list completed CDB words that match the active sequence (and contain additional characters) if the word immediately before the active word is in the CDB immediately before the completed word(s). One can disable this functionality if one want to use only next-word prediction, and not CDB word completion, in an Alphabetic T9 implementation. To disable CDB word completion, the integration layer calls T9AWClrCdbCompletion. To re-enable CDB word completion, the integration layer calls T9AWSetCdbCompletion.

Note that CDB word completion operates independently of UDB custom word completion, LDB word completion, and MDB word completion. Many of the words in a CDB are also in other Alphabetic T9 databases. Alphabetic T9 suppresses these duplicates from the selection list. However, the potential effect of this duplication on other API events functions should be noted. For example, a UDB custom word that is deleted from the database still appears in the selection list if that word is also in the CDB. Likewise, if one were to disable LDB word completion, words in the LDB still appear in the selection list as completed words if they are also in the CDB and CDB word completion is enabled.

Handling T9 Requests

Depending on how the CDB is implemented, the integration layer may need to handle the following T9 request:

T9REQCDBWRITE—Requests that the integration layer write data to the CDB. T9 submits this request only if the integration layer informs T9 that it, and not T9, writes data to the CDB.

Copy an Updated CDB to Persistent Memory

The integration layer should copy the CDB data to persistent memory when it terminates Alphabetic T9 if the database has been modified during the T9 session. T9 increments the value of T9AWCdbInfo.wUpdateCounter whenever it modifies the database. The integration layer can determine whether the database has been modified by comparing the value of wUpdateCounter after the session to its value before the session. If the value is different, the integration layer must copy the updated CDB data to persistent memory. Note that it is likely that T9 modifies the CDB during every session.

Operating an Alphabetic T9 CDB

Alphabetic T9 CDB operations consist of the following tasks:

Adding data to a CDB.
    Retrieving data from a CDB.
    Deleting data from a CDB.

Adding Data to a CDB

Alphabetic T9 automatically adds data to the CDB. Note that if the CDB is stored in a memory area that T9 cannot write to, the integration layer must write data to the CDB.

Retrieving Data from a CDB

Alphabetic T9 automatically retrieves data from the CDB.

Deleting Data from a CDB

Alphabetic T9 does not permit users or the integration layer to delete words from the database. Instead, Alphabetic T9 automatically begins deleting the oldest words in the database when it is nearly full. This removal process is referred to as garbage collection, and it occurs without any action by the user or integration layer.

Operation

In one embodiment, saved context data are used to return a prediction of the next word upon pressing the space, and to filter the word completions after entering key strokes. This, in principle, allows a user to reduce the number of keystrokes by quickly retrieving words that are correctly predicted based on the previous word or words. This completion feature is presently implemented by saving user entered text in a Context DataBase (CDB), and returning those words that match context and keystrokes.

NWP saves the recently entered user text and uses that text to predict the next word that the user enters. For example, if the user has typed the phrases 'hello Leslie,' hello Inger,' and 'Hello Helena' in the recent past, when the user types and accepts the word 'hello' by hitting space, the system suggests:

Leslie
    Inger
    Helena as possible next words.

If the user does not accept one of these words, but rather continues typing, the system uses context to prioritize completions presented to the user. In an embodiment employing a 12-key input device, if the above user types the 4 key after hitting space, the selection list presented to the user is:

i
    h
    g
    Inger
    Helena

If the above user types the 43 key after hitting space, selection list presented to the user is:

he
    if
    id
    ie
    ge
    gf
    Helena

After a space, the context database (CDB) objects make up the entire selection list. After pressing ambiguous keys, CDB objects appears as follows:

If CDB objects are of the length of the active key sequence, the objects appear at the top of the selection list.
    If CDB objects are of a length greater that is than that of the active key sequence, the objects appear at the top of the completion portion of the list.

System state tracks completions after space with:

pFieldInfo->nWordLen=0;
    pFieldInfo->nComplLen=length of context word.

After a user selects ambiguous keys, system state tracks CDB completions in the preexisting way:

pFieldInfo->nWordLen=length of active key sequence;
    pFieldInfo->nComplLen=length of completion.

API

The T9 API consists of a global structure which holds word, wordlist, and buffer information that is used by the customer, and a set of events or functions for building, accepting, and deleting words, scrolling through word lists, and more. In alphabetic T9, the API structure is referred to as the T9AWFieldInfo structure (often referred to as pAWFieldInfo). The T9AWFieldInfo contains data that is specific to alphabetic T9. The T9AWFieldInfo structure contains another structure, T9FieldInfo (often referred to as pFieldInfo), which contains general word data that is also used in Japanese, Chinese, and Korean T9.

New API structure data and functions were added to T9 to implement NWP. The NWP feature is active if the host has allocated space for the context database and set the pFieldInfo->pCdbInfo to a non-zero value.

The following function API event is added to activate the CDB:

T9AWCdbActivate(T9AWField Info*pAWField Info,
T9AWCdbInfo T9FARUDBPOINTER*pCdbInfo,
T9UINT nDataSize, T9U8 bSymbolClass);

To set writing configuration:
T9EVTCDB: T9CTRLSETCDBWRITEBYOEM
Function API—T9AWSetCdbWriteByOEM (T9AWFieldInfo*pAWFieldInfo)

To clear writing configuration:
T9CTRLCLRCDBWRITEBYOEM
Function API—T9AWClrCdbWriteByOEM (T9AWFieldInfo*pAWFieldInfo)

To reset the CDB:
T9EVTCDB:T9CTRLCDBRESET
(Function API call: T9AWUdbReset (T9AWFieldInfo*pAWFieldInfo)

To break CDB context:
T9EVTCDB:T9CTRLCDBBREAKCONTEXT
Function API—T9AWBreakCdbContext (T9AWFieldInfo*pAWFieldInfo)

To fill context buffer:
T9EVTCDB: T9CTRLCDBFILLCONTEXTBUFFER
buffer: pEvent->data.sCDBData.psBuf
buffer length pEvent->data.sCDBData.nBufLen
Function API—T9AWFillContextBuffer (T9AWFieldInfo*pAWFieldInfo, T9SYMB*psBuf, T9UINT nBufLen)

To get word prediction:
T9EVTCDB: T9CTRLCDBGETWORDPREDICTION
Function API—T9AWGetWordPrediction (T9AWFieldInfo VAWFieldInfo)

To clear buffer but retain context:
T9EVTCLEARBUFFE
Function API—T9AWClearBuffer (T9AWFieldInfo*pAWFieldInfo)

To turn off CDB completion:
T9CTRLCLRCDBCOMPLETION
Function API—T9AWClrCdbCompletion (T9AWFieldInfo*pAWFieldInfo)

To turn on CDB completion:
T9CTRLSETCDBCOM PLETION
Function API—T9AWSetCdbCompletion (T9AWFieldInfo*pAWFieldInfo)

To turn off CDB completion:
T9CTRLCLRCDBPREDICTION
Function API—T9AWClrCdbPrediction (T9AWFieldInfo VAWFieldInfo)

To turn on CDB completion:
T9CTRLSETCDBPREDICTION
Function API—T9AWSetCdbPrediction (T9AWFieldInfo VAWFieldInfo)

The following request type is added:
T9REQCDBWRITE

This is used to request writes to CDB if external write is on.

There is no additional direct access to write to the CDB through the API.

Internal CDB interfaces

Two interfaces to the CDB exist in the T9 embodiment:
AddCdbText(pFieldInfo, psWordBuf, nLen)
Where:
pFieldInfo=T9 fieldinfo
psWordBuf=buffer holding text
nLen=word length And:
GetCdbObject(pFieldInfo, nUdbObjNum, nWordLen, nCursor, psBuildTxtBuf, nBuildTxtBufSize, pnComplLen, pnUdbObjCnt)
Where:
pFieldInfo=T9 fieldinfo
nUdbObjNum=CDB object number (1 for $1^{st}$ match, 2 for second match, etc)
nWordLen=word length (o after space, 1 after 1 key, 2 after 2 keys, etc)
nCursor=cursor position
psBuildTxtBuf=pointer to build buffer
nBuildTxtBufSize=build buffer size
pnComplLen=pointer to completion length holder
pnUdbObjCnt=pointer to object count holder.

Functions
T9STATUS T9FARCALL T9AW_SaveAndAddToCdb (T9AWFieldInfo*pAWFieldInfo)

Adds Saves word to context buffer and add to context database. This function is called only after a space has been entered.

T9UINT T9FARCALL T9AW_GetCdbObject (T9AWFieldInfo*pAWFieldInfo, T9UINT nCdbObjNum, T9UINT nWordLen, T9UINT nCursor, T9U8 bObjectType, T9UINT*pnTerminal, T9U8 bRightMost, T9SYMB*psBuildTxtBuf, T9UINT nBuildTxtBufSize, T9UINT*pnComplLen, T9UINT*pnCdbObjCnt)

This function retrieves context matches from the CDB.

T9STATUS T9FARCALL T9AWCdbReset (T9AWFieldInfo*pAWFieldInfo)

This function resets the CDB.

T9STATUS T9FARCALL T9AWCdbActivate (T9AWFieldInfo*pAWFieldInfo, T9AWCdbInfo T9FARUDBPOINTER*pCdbInfo, T9U8 bSymbolClass)

This function activates the CDB.

Database

Present minimum database size requirements are 1800*symbol width (300 words*6 chars/word*symbolwidth bytes/char). This is 1800 for one-byte systems, and 3600 for two-byte systems.

The CDB saves recently entered text in the same form that the user enters it. The text is stored in a circular buffer. New words overwrite the least recent word in the CDB.

The CDB has global information in its header:

```
T9U16 wDataSize;      /* Total size in bytes of this struct*/
T9U16 wUpdateCounter; /* Count incremented each time user database modified */
T9U16 wSymbolClass;   /* T9 enum value indicating symbol table mapping for CDB
*/
T9U16 wDataBeginOffset;   /* Offset to beginning of data */
T9U16 wDataEndOffset;     /* Offset to end of data */
T9U16 wSavedOffset;       /* pointer to last accessed position in database */
T9U32 dwOffsetSaver;      /* identifier for thread that last saved offset. */
T9U8  bDataArea[1];       /* Really a variable size data array */
```

Reads

When requesting a word from the CDB, the system word builder passes a context buffer. Using the context buffer the CDB retrieves context matches in order of recency.

Writes

When the space key is hit, or white space is entered explicitly, the built word is written to the CDB. This happens in both ambiguous and multitap (MT) modes. The word also goes through its normal RUDB processing. There is no garbage cleanup in the CDB.

Context Buffer

A context buffer is maintained. The context buffer is updated on the pressing of space key and is cleared with any action that tends to lose context, such as cursoring and clearing. In a word API this is attached to the flushword function of a separate confirm function.

Functional Description

In the T9 embodiment, the NWP feature is active if:
a) the compile includes the code for this feature; and
b) the field info member pFieldInfo->pCdbinfo points to valid memory.

The functional elements that apply when the next word prediction feature is active in T9 are listed below:

FD100: T9 core saves in the CDB every recent word that was used. The number of words saved depends on the size allocated by the OEM to the CDB.

FD200: T9 ambiguous and MT modes return next word predictions after a space if there is an active word or the previous key hit is a T9 number key.

FD300: T9 ambiguous and MT modes return next word predictions after right arrow and space if there is an active word before the right arrow is pressed.

FD301: The result of FD300 and FD200 mean:
After cursoring off a word, and moving around the buffer, T9 does not present a prediction after space is hit.
"Cursoring around the buffer," means pressing either the left arrow or the right arrow, and ending with the cursor to the right of a word. The only exception is when the right arrow is hit to only flush (deactivate) a word.
T9 presents a prediction if a prediction is active and the user hits space to clear the prediction, hits clear again to clear the space, and then hits space again.

FD400: T9 always produces context matches when starting a word if that word is preceded by a space and another word. As an example, no prediction is delivered after cursoring around the buffer to the right of a word and hitting key space. However, if the user continues to type ambiguous number keys, context matches are delivered in the selection list.

FD500: CDB predictions/completions are retrieved in order of recency.

FD600: CDB is language independent.

FD700: After pressing space, the limit of the number of CDB matches is determined by the compile-time macro T9MAXCDBMATCHES. After the user presses number keys, there is no limit on the number of CDB matches delivered from the CDB to the builder.

FD800: No CDB predictions/completions are delivered across sentence punctuation. Sentence punctuation is defined as trailing punctuation on a non-emoticon. See FD1200 for definition of emoticon.

FD900: CDB predictions/completions are removed after pressing clear with a word active, but completions are delivered as the user begins typing again.

FD1000: There is no aging of the CDB; the least recent word is replaced by the most recent word entered.

FD1100: Context bigrams are recorded in the CDB on pressing space if there is an active word, or the previously hit key is a T9 number key. If the user cursors off a word, context is broken in the CDB.

FD1200: Candidates for context predictions are subject to the following processing:
If the word has no leading punctuation, trailing punctuation is stripped unless this looks like an emoticon. T9 assumes a word with trailing or leading punctuation is an emoticon if the word is more than one character and the number of non-alpha characters (punctuation and numbers) is at least one-half the total number of characters in the word. This is the same rule that is used for user database (UDB) processing.
If the word HAS leading punctuation, the word is rejected unless it appears to be an emoticon.

FD1300: If the user has pressed a number of T9 keys, context selection list items of the length of the key sequence are delivered at the beginning of the selection list. Context selection list items with completions are delivered at the top of the completion portion of the list, followed by MDB, UBD, and LDB in previously specified order.

FD1400: If caps-lock is on when space is hit, predicted words are entirely in upper case.

FD1500: The leading word is agnostic to case, but the trailing word is case sensitive. So if one types in "cab fee" and then turns on caps-lock and types in "CAB" and space, the system predicts "FEE." If one types in "cab fee," then types in "CAB" using shift rather than caps-lock, and then selects space, the system predicts "fee." Likewise, if one types in "Cab fee" and then types in "cab" and space, the system predicts "fee."

FD1600: Switches are available to turn on/off context predictions, and to turn on/off context completions.

Context Predictions and Completions in T9

Use Case:
1) User has recently entered the bigrams 'my money,' my time,' and 'my marriage' in order written here.
2) User enters and accepts the word 'my.'

3) Hit space.
4) Expect selection list:
   marriage
   time
   money
5) User enters 6 key.
6) Expect selection list:
   o
   m
   n
   6
   marriage
   money
7) User enters 6 key again.
8) Expect selection list:
   on
   no
   mm
   mo
   oo
   money Use Case:
1) User has recently entered the bigram 'bow tie'.
2) User enters and accepts the word 'bow.'
3) Hit space.
4) Expect selection list:
   tie
5) User enters 8 4 3 keys.
6) Expect selection list:
   tie
   the
   vie
   vid
   tid NOTE: Even though the word 'the' is the most common word in the English language, in this context, 'tie' is presented first in the list. It is the most likely candidate when preceeded by the word 'bow.'

Context Predictions and Completions in Multitap

Use Case:
1) User has recently entered the bigrams 'my money,' my time,' and 'my marriage' in order written here.
2) User enters the word 'my.'
3) Hit space.
4) Expect selection list:
   marriage
   time
   money
5) User enters an 'm.'
6) User presses next key.
7) Expect selection list:
   m
   marriage
   money
8) User enters 'o.'
9) User presses next key.
10) Expect selection list:
    mo
    money Context Predictions and Completions in T9 (Flushing Before Space).

Use Case:
1) User and has recently entered the bigrams 'my money,' my time,' and 'my marriage' in order written here.
2) User enters the word 'my.'
3) Hit right arrow.
4) Hit space.
5) Expect No context predictions.
6) User enters 6 key.
7) Expect selection list:
   o
   m
   n
   6
   marriage
   money
8) User enters 6 key again.
7) Expect selection list:
   on
   no
   mm
   mo
   oo
   money Context Predictions and Completions with UDB Completions in T9

CDB completions appear ahead of UDB completions.

Use Case:
1) User has recently entered the bigrams 'my money,' my time,' and 'my marriage,' and the unigram Thobetterblues' in order written here.
2) User enters and accepts the word 'my.'
3) Hit space.
4) Expect selection list:
   marriage
   time
   money
5) User enters 6 key.
6) Expect selection list:
   o
   m
   n
   6
   marriage
   money
   mobetterblues
7) User enters 6 key again.
8) Expect selection list:
   on
   no
   mm
   mo
   oo
   money
   mobetterblues Context Predictions and Completions in T9 (Case Sensitivity)

Leading word is agnostic to case, trailing word is case sensitive. If space is hit with caps-lock on, the predicted word is entirely in upper case.

Use Case:
1) User has recently entered the bigrams 'my MONEY,' 'my time,' and 'MY marriage' in order written here.
2) User enters and accepts the word 'my.'
3) Hit space.
4) Expect selection list:
   marriage
   time
   MONEY
5) User enters clear key.
6) User enters and accepts the word 'MY' without caps-lock on.

7) Expect selection list:
   marriage
   time
   MONEY
8) User enters clear key.
9) User enters and accepts the word 'MY' with caps-lock on.
10) Expect selection list:
    MARRIAGE
    TIME
    MONEY Context Predictions and Completions with UDB Completions in Multitap CDB completions appear ahead of UDB completions.
Use Case:
1) User and has recently entered the bigrams 'my money,' my time,' and 'my marriage,', and the unigram Thobetterblues' in order written here.
2) User enters the word 'my.'
3) Hit space.
4) Expect selection list:
   marriage
   time
   money
5) User enters 'm.'
6) User presses next key.
7) Expect selection list:
   m
   marriage
   money
   mobetterblues
8) User enters 'o.'
9) User presses next key.
10) Expect selection list:
    mo
    money
    mobetterblues Context Predictions and Completions with UDB Completions in T9 (Broken Context)

CDB completions appear ahead of UDB completions.
Use Case:
1) User and has recently entered the bigrams 'my money,' my time,' and 'my marriage,', and the unigram Thobetterblues' in order written here.
2) User enters and accepts the word 'my.'
3) Hit space.
4) Hit clear.
5) Hit clear again, or any other cursoring to end up with cursor directly to the right of
"my."
6) Enter Space.
7) Expect no context predictions (functional description FD200).
8) User enters 6 key.
9) Expect selection lists with context (functional description FD400).
10) Expect selection list:
    o
    m
    n
    6
    marriage
    money
    mobetterblues 11) User enters 6 key again.
12) Expect selection list:
    on
    no
    mm
    mo
    oo
    money
    mobetterblues Context Predictions and Completions in T9 (Recency Over Frequency)

CDB completions appear ahead of UDB completions.
Use Case:
1) User and has recently entered the bigrams, 'my money,' my money,' my marriage' in order written here.
2) User enters and accepts the word 'my.'
3) Hit space.
4) Expect selection list (more recent 'marriage' comes before more frequent 'money'):
   marriage
   money
5) User enters 6 key.
6) Expect selection list:
   o
   m
   n
   6
   marriage
   money Languages
CDB is language independent.

Reorder of Non-Completed Words
RUDB processes around reordering of non-completed words remain unchanged.

Clearing
Context predictions are not delivered after clearing a current word, but are delivered as the user begins typing again.

Punctuation
No context predictions are delivered across sentence punctuation.

Aging
There is no aging of the CDB, the least recent word is replaced by the most recent word entered.

Garbage Collection
When space is needed to enter a new word into the CDB, the least recent word in the CDB is removed to make room.

Entering Words in MT
Data for CDB is collected while in MT, and context predictions/completions are delivered in MT.

My Words
CDB processing occurs on the addition of space character, whether or not the context word was entered in a user maintained MyWords database.

Other Examples
Although this disclosure includes reference to various exemplary embodiments, one skilled in the art will readily appreciate that other applications may be substituted for those set forth herein without departing from the spirit and scope of the present invention.

For example, user actions or inputs can affect the automatic changing of the device's state based on context. For example, the system might use context to change a mobile telephone from 'ring' to 'vibrate', during the time that the calendar shows that the user is in a meeting. Another embodiment uses location context to increase the mobile telephone volume when the user is outside or when the telephone detects high levels of background noise. In another embodiment, the system learns the user habits. For example, based on the learned user action, the system is able to offer services to the user that the user may not be aware of. In another embodiment, word prediction is based on the previous word context (bigram context), but might also use the previous 'n' words (trigram context, etc).

Using Environmental Cues to Predict & Implement User Actions

FIG. 5 shows a sequence 500 to illustrate an example of a different process aspect of this disclosure. Broadly, this sequence operates a handheld computing device to automatically detect cues describing the device's environment and user actions performed with the device, learn which cues and cue combinations are relevant to predict user actions, and then in response to occurrence of the relevant cues, predictively implementing the appropriate user action or configuring the device in anticipation of user action.

The example of FIG. 5 is described in the specific context of the handheld computing device 101 of FIG. 2 as described above. Such device 101 may, optionally, include telephone features according to FIG. 1. This particular example is used for ease of explanation, and to provide an adequate foundation for discussing a wide range of features of the sequence 500, without any intended limitation.

In step 502, the device 101 detects cues. In one example, the CPU 100 stores a list of detected cues in 123 in the storage 104 (FIG. 2). Broadly, the cues describe the environment, state, or other context of the device 101, whether this is a physical state, machine state, state of application programs 112-114 or other software, contents of the storage 104, or other context. Since the stated context is environmental, it reaches beyond mere data entry by the user. As shown by 502a, step 502 may performed on a repeating basis. For example, the machine 101 may perform step 502 on a continuous, substantially continual, periodic or non-periodic but scheduled, or other repeating basis.

In step 502, then, the device 101 detects all available cues. This involves the CPU 100 evaluating the state of the sensors 55, operating system 106, application programs 112/114, and processing this input as needed to determine the nature and extent of the presently occurring cues. Some examples of cues include:

- the machine 101's application context, as well as changes in the machine's application context, such as which application(s) the CPU 100 is presently running, the history of which applications have been opened or closed or minimized or maximized by the user, the identity and/or sequence of menu(s) invoked and menu entries selected by the user, etc. In a multi-tasking environment, the application context may refer to which application the user currently has opened. In a specific example, the application context includes a recognition that user is currently operating an instant messaging application such as AOL Instant Messenger (AIM).
- the machine 101's computing environment, such as the processing load, presence or absence of detachable peripheral devices, network capacity, connectivity, computing costs, etc.
- the geographic location of the machine 101, as detected by a GPS engine included in the sensors 55.
- the time of day, day of week/month/year, or other chronological indication of a clock or timer that is included in the sensors 55.
- type, magnitude, frequency, and/or pattern of physical properties detected by various sensors 55 (FIG. 2), such as ambient noise detected via microphone, ambient light detected via a light sensor, pressure sensed by a pressure transducer; heat detected by IR sensor, motion detected via one or more accelerometers, etc. Cues may concern individual pieces of information, or combined items of data. For example, one cue may specify a given situation of the device relative to the user, such as "device in-hand" versus "device in-pocket" according to various combinations of light, temperature, and accelerometer outputs.
- the software state of the device 101 by virtue of the user having performed a given sequence of menu or other operations within an application, or having opened or closed an entire application.
- while in an instant messaging or email application, the message recipient, and/or the message sender, which can indicate preferences for things like a shared lingo, a frequent topic of conversation, a preferred channel of communications, and/or interrelationships with other data stored on the device such as sets of pictures or music tracks.
- a state of the device 101 resulting from information received from an external source, such as wireless or wired download, user input, firmware upgrade, etc.

Broadly, in step 503 the CPU 100 monitors and analyzes operation of the device 101 to identify any user actions that can be associated with the cues from step 502. In other words, step 503 learns which if any cues and combinations of cues are relevant predictors of which of user actions. "User actions" include virtually any action that the user, by operating the user input 54, can instruct the device 101 to perform, such as configuring the device and operating its application programs. Without any intended limitation, some examples as to configuring the device include switching to hands-free or voice navigation driving mode, causing associated cell phone to enter a silent or vibrate mode, adjusting display brightness, etc. Some further examples as to operating application programs include opening an application program, closing a program, existing or entering a given mode of program operation, selecting a given menu entry in a program, configuring settings of a program, etc.

As shown by 503a, step 503 may performed on a repeating basis, such as continuously, periodically, on a non-periodic schedule, etc. In one example, step 503 detects user actions and maintains a running list of user actions. In the example of FIG. 2, the user actions are stored in actions 125 (FIG. 2). After initially detecting and cataloguing the user actions, or concurrently with this step, the CPU 100 analyzes the user actions 125 against the detected cues 123 (from 502) to learn which (if any) of the cues are relevant predictors for which of the user actions. In other words, this step identifies each logically connected pair from 123/125, where occurrence of a state cue is a reliable indicator of a certain user action. Some cues may be meaningless, in that they are not relevant to predict any following user actions. Likewise, some user actions might never be preceded by any predictable context cue. In other cases, where the machine 101 finds that occurrence a context cue is likely to be followed by given user action, then the machine 101 constructs a mapping 124 between associated cues 123 and user actions 125. Furthermore, step 503 may recognize cases where certain cue combinations are relevant predictors of user actions.

Step 503 may establish a threshold of required likelihood, such as 100% (=always) or a lesser threshold, defining a minimum probability relationship between a set of cues and its resultant user action.

In step 503, the mapping 124 may be constructed in various ways. For example, the mapping 124 may be prepared by using a neural network or by constructing an associative array. In another example, the mapping 124 may be prepared by empirical data, for example, by randomly assigning cues to user actions and continually refining this model by discarding unworkable cue-action links and reinforcing proven cue-action links. Another example of how to prepare the mapping 124 is specifically described below, under the heading "One Example of Mapping."

For each user action 123 that step 503 found a corresponding cue 124 (or cue combination) to be a relevant predictor, the CPU 100 (step 504) plans one or more machine-executed actions to (1) configure the device in anticipation of this action, or (2) cause the device carry out the next user action, (3) or to priority certain interpretations of inherently ambiguous user-entered text.

In the case of configuring the device in anticipation of user action, this may involve configuring hardware or software settings, starting or ceasing or minimizing or maximizing an application program, opening or closing a menu, advancing to a given point in a menu structure, or any other action to expedite or assist with implementation of the user action. In the case of causing the device to perform the next user action, this operation involves causing the device 101 to carry out the action that the user is predicted to do anyway. In the case of prioritizing certain interpretations of ambiguous user-entered text, this involves favoring a disambiguated interpretation of handwriting, telephone keypad, or other user text input that is consistent with the cue. As shown by 504*a*, step 504 may performed on a repeating basis, such as continuously, periodically, on a non-periodic schedule, etc. in order to maintain a sufficiently refined list of predictive actions.

As to predictive actions configuring the device 101, the following shows some examples of these.
  switching to hands-free or voice navigation driving mode.
  causing associated cell phone to enter a silent or vibrate mode.
  configuring the menu to include or highlight an expected follow-up menu entry.
  anticipating the user opening his/her favorite messaging application by configuring the device 101 to bypass the normal menu hierarchy, or by starting the messaging application automatically, or by prominently displaying an option to start the messaging application.
  opening an application program.

As to predictive actions relating to disambiguation, some examples of these include:
  promoting the user's screen name as the best interpretation a user-entered key sequence.
  favoring interpretations of user entered text consistent with city, state, and street address or other geographic indicator.
  promoting words consistent with the time of day, time of year, month, etc. For example, near noon time, the device 101 may promote "lunch" while in the evening the device 101 promotes "dinner" or "supper."
  favoring interpretations of user entered text consistent with the field where text is entered.

In an alternative to the preceding description, instead of identifying historical associations between user actions and cues, step 503 may propose user action that is logically appropriate for the cues even if such action has never been taken. Even more particularly, step 503 may propose that ambiguously entered user text be prioritized according to an context indicated by certain cues. This user action, as discussed below, is carried out in step 508*b*. As a further example of the foregoing alternative embodiment, step 503 may propose automatically favoring a user's screen name as the best interpretation of a user-entered key sequences whenever the user is operating an instant messaging application. In another example, step 503 proposes automatically favoring text (such as zip code, address, city, state, etc.) consistent with a cue of detected geographic location. In still another example, step 503 may propose automatically favoring interpretations of user entered text consistent with the time of day, day of week, month, or year in order to remain consistent with a cue of detected time. In still another example, step 503 may propose automatically favoring interpretations of user entered text consistent with a form field in response to a cue indicating that a text entry cursor lies in a given field.

After step 504, step 506 monitors for occurrence of one of the cues or cue combinations that was found to constitute a relevant predictor of a user action and mapped to that action in step 503. In the absence of any such cues, step 506 repeats (506*c*) to wait for the next relevant cue. Whenever the CPU 100 finds that a relevant predictor has occurred (506*a*, 506*b*), the CPU 100 performs the correlated (via 124) machine-executed action (125/504) in steps 508*a* or 508*b*. These actions, planned in step 504 and discussed above, include anticipating the next user action (508*a*) and prioritizing inherently ambiguous user text entry (508*b*).

The following examples illustrate some examples of steps 506, 508*a*, and namely, detecting a relevant predictor and performing a correlated predictive action. In one example, where the device 101 is implemented as a cell phone, the device detects (506) street noise, the CPU 100 automatically switches (508*a*) to hands-free or voice navigation driving mode. In another example, when the device 101 detects (506) arrival of a meeting time recorded in an integrated calendar program, the device 101 automatically puts (508*a*) an associated cell phone into a silent or vibrate mode. In another example, when the device 101 detects (506) that the user has performed a first menu entry, the CPU 100 automatically configures (508*a*) the menu to include or highlight an expected follow-up menu entry. As a more particular example of this, when the device 101 finds (506) that the user has performed a cut function inside an application program, the device 101 may automatically restructure, prune, or otherwise modify the "edit" menu (508*a*) to highlight the "paste" action; similar activity may be conducted for search/replace or other related menu entries.

As another example, when the device 101 detects (506) that the user has entered a settings mode of the device 101 and chosen an input method or language, the device 101 anticipates (508*a*) the user opening his/her favorite messaging application by automatically configuring (508*a*) the device 101 to bypass the normal menu tree and open the messaging application automatically, or to present a prominent option in a settings window or elsewhere along with the anticipated user action. The device 101 may also present an option "display regular menu" in case the anticipated action turns out to be incorrect. As another example, when the device 101 detects (506) that the user has taken a picture with the flash turned on, the device 101 anticipates (508*a*) that the photo editing tool palette needs to include the "red eye" removal tool; or, further, by making red eye detection and selection the first step when the user next launches the photo editing application with that picture.

As another example of 506/508*a*, when the device 101 detects (506) user completion of a given application program, the device 101 automatically opens (508*a*) another application program. For example, the device 101 may have learned that the user always opens a "note pad" application after completing a phone call. In another example, the device 101 responds to user completion of a phone call to his psychic (506) by initiating (508*a*) an instant message to the user's stockbroker.

The following illustrates some examples of steps 506/508*b*, and namely, detecting a relevant predictor and performing a correlated predictive action relating to disambiguation. In one example, when the device 101 detects (506) that the user has an instant messaging application open, the device 101 automatically promotes (506*b*) the user's screen name as the best interpretation of a user-entered key sequence. In another example, when the device 101 detects (506*a*) a geographic location obtained from an integrated or remotely coupled GPS unit, the device 101 favors (506*b*) interpretations of user entered text consistent with that geographic location such as the city, state, or a nearby street address. More particularly, when the device 110, using data from an integrated or remotely coupled GPS unit, senses a geographic location near Queen Anne Ave N and W Galer St., Seattle, Wash., the device 101 automatically promotes 98119 as the best interpretation of a user-entered key sequence in a zip code field.

In another example, when the device 101, using data from an integrated or remotely coupled clock, senses (506*a*) the date and/or time, the device 101 automatically promotes (508*b*) words consistent with the time of day, time of year, month, etc. For example, if the user enters "Let's go out for" in an instant messaging application, the machine 101 may promote or suggest "lunch" when the time is near noon. As another example, if the user types "I want to go", the machine 101 may promote or favor "skiing" in the winter and "swimming" in the summer. As another example, when device 101 detects (506*a*) that the cursor, in a currently open application, is located in certain form field, the disambiguation operation favors (508*b*) interpretations of user entered text consistent with the field.

After each performance of an action (508*a*, 508*b*), the process 500 returns to step 506 to check for the next predictor.

One Example of Mapping

As mentioned above, the mapping operation of step 503 (FIG. 5) may be implemented in various ways. One example is discussed in U.S. Provisional Application 60/734,840 filed 11-9-2005 in the name of Guarav Tandon, which is incorporated herein by reference. Other examples are discussed in U.S. patent application Ser. No. 11/392,186 filed 3-28-2006 in the name of Guarav Tandon, which is also incorporated herein by reference.

The following provides an additional, more specific example of the mapping operation of step 503 (FIG. 5). In this example, a learning sequence randomly chooses instances on the basis of matching target values. Further, in various embodiments, the learning sequence generates candidate rules by randomly selecting matching attribute values, the motivation being that matching attributes would help capture the correlation between the various attributes. The learning sequence then removes rules that are redundant, with the more general rules being preferred over the specialized ones. The learning sequence then updates rules over the entire initial instance space such that the consequent has last m values for the target attribute given all conditions in the antecedent are true (m being an integer). The learning sequence further associates every rule with a weight. In various embodiments, the weight is initialized to one. In alternate embodiments, other initial values may be practiced.

The following are some exemplary rules: (1) if sponsor-attendees=mitchell and department-attendees=scs then location=weh5309, weh5311, Oakland, (2) if group-name=cs-faculty then location=weh4623, (3) if department-attendees=scs and position-attendees=grad-student and course-name=nil then location=weh5309, weh5307, unknown, (4) if seminar-type=ai then location=weh4623, weh5409, (5) if course-name=ml-course then location=weh4623, weh4601, unknown.

The rules generated by the learning sequence are variable in length. When a new instance is encountered, the learning sequence checks all rules against it. The rules whose antecedents are true for the current instance are considered to be eligible to vote on the target value. Each conformed rule votes for its most frequent antecedent value and the number of votes is same as the weight for the rule. In various embodiments, initially, all conformed rules have equal vote (since they all have the same initial weight, e.g., one).

The learning sequence then aggregates the votes and predicts the target value. In various embodiments, the learning sequence predicts the target value with the majority vote. If no rule antecedent is true, a default majority value is predicted from the last m outcomes.

In various embodiments, the learning sequence decreases the weight if the local pre-diction by a participating rule is incorrect, irrespective of the correctness of the global outcome. In various embodiments, the decrement is by half. In various embodiments, when the local prediction is correct but the global outcome is incorrect, the learning sequence measures the vote deficit for the actual prediction. After that, the learning sequence increases the weights for all the rules that had the correct local prediction in the event the global outcome failed to predict correctly. In various embodiments, the weights are increased equally. This boosts the vote for the correct target value.

In various embodiments, when a rule (and the global outcome) predicts correctly, the learning sequence increments its weight conservatively. The technique conjectures that this reward raises the confidence (weight) of the rule for future predictions. In various embodiments 0.1 is employed as the reward value. In various embodiments, different reward values may be employed. Liberally rewarding the rules eventually may lead to a drop in the performance, so this parameter is generally selected carefully. Moreover, experiments appear to suggest a small linear increase in weight performs much better than exponential increase. In various embodiments, if the weight of any rule falls below a user-defined threshold, the rule is removed from the ruleset.

In various embodiments, if the antecedent of any rule matches the current instance but the target value is not present in the consequent, the learning sequence updates the rule by replacing the oldest target value with the current one. Further, in various embodiments, if the prediction is incorrect, the learning sequence updates the instance space by replacing the oldest instance with the current one. New rules are generated the same way as the initial rules, and redundancy is removed. New rules are each assigned a weight, in various embodiments, the weight of one. The learning sequence then uses this updated model for subsequent instance. The model is thus updated incrementally.

OTHER EMBODIMENTS

While the foregoing disclosure shows a number of illustrative embodiments, it will be apparent to those skilled in the art that various changes and modifications can be made herein without departing from the scope of the invention as defined by the appended claims. Accordingly, the disclosed embodiment are representative of the subject matter which is broadly contemplated by the present invention, and the scope of the present invention fully encompasses other embodiments which may become obvious to those skilled in the art, and that the scope of the present invention is accordingly to be limited by nothing other than the appended claims.

All structural and functional equivalents to the elements of the above-described embodiments that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for" or, in the case of a method claim, the phrase "step for."

Furthermore, although elements of the invention may be described or claimed in the singular, reference to an element in the singular is not intended to mean "one and only one" unless explicitly so stated, but shall mean "one or more". Additionally, ordinarily skilled artisans will recognize that operational sequences must be set forth in some specific order for the purpose of explanation and claiming, but the present invention contemplates various changes beyond such specific order.

In addition, those of ordinary skill in the relevant art will understand that information and signals may be represented using a variety of different technologies and techniques. For example, any data, instructions, commands, information, signals, bits, symbols, and chips referenced herein may be represented by voltages, currents, electromagnetic waves, magnetic fields or particles, optical fields or particles, other items, or a combination of the foregoing.

Moreover, ordinarily skilled artisans will appreciate that any illustrative logical blocks, modules, circuits, and process steps described herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, DVD, or any other form of storage medium known in the art. An exemplary storage medium is coupled to the processor such the processor can read information from, and write information to, the storage medium. In the alternative, the storage medium may be integral to the processor. In another example, the processor and the storage medium may reside in an ASIC.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A handheld computing device, comprising:
    a processor programmed for learning user action predictors by monitoring and recording both of cues describing the device environment and user performed actions of configuring the device and operating its application programs;
    in response to occurrence of one or more of said learned user action predictors, said processor performing any of configuring said device in anticipation of said user action, causing said device carry out a next user action, and prioritizing certain interpretations of inherently ambiguous user-entered text input; and
    said processor favoring a disambiguated interpretation consistent with a present environment of the device, where the present environment of the device includes detected geographic location and the prioritizing operation comprises planning a disambiguation operation comprising favoring interpretations of user-entered text input consistent with said geographic location.

2. The device of claim 1, further comprising:
    said processor learning which, if any, of the recorded cues and combinations of recorded cues are relevant predictors of which of the recorded user actions;
    for each user action having a learned relevant predictor, planning one or more of the following types of machine-executed actions:
        configuring the device to streamline user performance of the user action; and
        causing the device to perform the user action.

3. The device of claim 1, further comprising:
    said processor monitoring and recording activity including at least the following:
        user performed actions of configuring hardware of the device;
        user performed actions of starting an application program or system function;

user performed actions of operating menus including navigating said menus and selecting entries of said menus; and user performed actions of entering a hardware or software mode.

4. The device of claim 1, further comprising:

said processor streamlining user performance of the user action by at least the following operations:
configuring hardware of the device;
starting an application program or system function of the device;
starting an operation whose initiation is represented upon one or more menus provided by the device;
bypassing or prioritizing one or more components of one or more menus provided by the device; and
entering a hardware or software mode of the device.

5. The device of claim 1, wherein, while in a messaging application, said cues comprise one or more of the following:

a message recipient, sender, subject, priority, delivery method, delivery channel;
time including one or more of the following: day of week, month, year, time of day;
geographic location;
characteristics of ambient noise detected by the device;
software state of the device; and
application context of the device.

6. The device of claim 1, further comprising:

said processor monitoring and recording at least the following:
physical state detected by one or more sensors;
application program state; and
changes in application program state.

7. The device of claim 1, further comprising:

said processor prioritizing interpretation of inherently ambiguous user-entered text input by favoring a disambiguated interpretation consistent with the relevant predictor.

8. The device of claim 1, wherein said processor prioritizing further comprises:

where the present environment of the device includes the device having a messaging application open, promoting a user identifier as best interpretation of user-entered text input;
where the present environment of the device includes a detected chronological indication, favoring interpretations of user-entered text input consistent with the detected chronological indication;
where the present environment of the device includes a software application being open with a user-positioned cursor residing in a form field, favoring interpretations of user-entered text input consistent with a data type associated with the form field.

9. The device of claim 1, further comprising:

responsive to receiving inherently ambiguous user-entered text input, said processor prioritizing interpretation of inherently ambiguous user-entered text input by favoring a disambiguated interpretation consistent with a present environment of the device, where said consistency is according to a predetermined logic independent of a learned association between the environment and an interpretation of user-entered text input.

10. A handheld computing device, comprising:

a processor programmed for learning user action predictors by monitoring and recording both of cues describing the device environment and user performed actions of configuring the device and operating its application programs;
in response to occurrence of one or more of said learned user action predictors, said processor performing any of configuring said device in anticipation of said user action, causing said device carry out a next user action, and prioritizing certain interpretations of inherently ambiguous user-entered text input;
said processor favoring a disambiguated interpretation consistent with a present environment of the device, where the present environment of the device includes detected geographic location and the prioritizing operation comprises planning a disambiguation operation comprising favoring interpretations of user-entered text input consistent with said geographic location;
for a cue comprising arrival of a start time for an entry of an calendar application of the device, invoking a silent mode of operation of the device;
for a cue comprising presence of a given character of ambient noise, switching the device to a hands free mode, or increasing an output volume of the device;
for a cue comprising user selection of a prescribed menu entry, configuring the menu to streamline an expected user-invoked follow up action; and
for a cure comprising change in application state of a first application, automatically opening a second application, streamlining opening of the second application, prioritizing access to functions offered by the second application.

11. A processing method for a handheld computing device, comprising:

providing a processor programmed for learning user action predictors by monitoring and recording both of cues describing the device environment and user performed actions of configuring the device and operating its application programs; and
in response to occurrence of one or more of said learned user action predictors, said processor performing any of configuring said device in anticipation of said user action, causing said device carry out a next user action, and prioritizing certain interpretations of inherently ambiguous user-entered text input; and
said processor favoring a disambiguated interpretation consistent with a present environment of the device, where the present environment of the device includes detected geographic location and the prioritizing operation comprises planning a disambiguation operation comprising favoring interpretations of user-entered text input consistent with said geographic location.

* * * * *